United States Patent
Pedersen et al.

(10) Patent No.: US 10,591,912 B2
(45) Date of Patent: Mar. 17, 2020

(54) AUTONOMOUS VEHICLE REMOTE SUPPORT MAPPING INTERFACE

(71) Applicants: Nissan North America, Inc., Franklin, TN (US); Florida Institute for Human & Machine Cognition, Inc., Pensacola, FL (US)

(72) Inventors: Liam Pedersen, San Francisco, CA (US); Maarten Sierhuis, San Francisco, CA (US); Hans Utz, Campbell, CA (US); Mauro Della Penna, San Francisco, CA (US); Jeffrey Bradshaw, Nampa, ID (US); Matthew Johnson, Pensacola, FL (US); Michael Vignati, Pensacola, FL (US); Lawrence Bunch, Pensacola, FL (US)

(73) Assignees: Nissan North America, Inc., Franklin, TN (US); Florida Institute for Human & Machine Cognition, Inc., Pensacola, FL (US)

( * ) Notice: Subject to any disclaimer, the term of this patent is extended or adjusted under 35 U.S.C. 154(b) by 0 days.

(21) Appl. No.: 16/348,784

(22) PCT Filed: Nov. 30, 2017

(86) PCT No.: PCT/US2017/063816
§ 371 (c)(1),
(2) Date: May 9, 2019

(87) PCT Pub. No.: WO2018/102475
PCT Pub. Date: Jun. 7, 2018

(65) Prior Publication Data
US 2019/0294159 A1 Sep. 26, 2019

Related U.S. Application Data

(60) Provisional application No. 62/428,026, filed on Nov. 30, 2016.

(51) Int. Cl.
G05D 1/00 (2006.01)
G08G 1/00 (2006.01)
G08G 1/13 (2006.01)

(52) U.S. Cl.
CPC ......... G05D 1/0038 (2013.01); G05D 1/0061 (2013.01); G05D 1/0088 (2013.01);
(Continued)

(58) Field of Classification Search
CPC .. G05D 1/0038; G05D 1/0088; G05D 1/0061; G05D 2201/0213; G08G 1/13; G08G 1/207
(Continued)

(56) References Cited

U.S. PATENT DOCUMENTS

2009/0132163 A1\* 5/2009 Ashley, Jr. ............ G01S 5/0045
701/467
2014/0210646 A1\* 7/2014 Subramanya ........... B61L 29/28
340/928

(Continued)

FOREIGN PATENT DOCUMENTS

JP 2008-076310 A 4/2008
JP 2015-509195 A 3/2015
(Continued)

*Primary Examiner* — Shardul D Patel
(74) *Attorney, Agent, or Firm* — Young Basile Hanlon & MacFarlane, P.C.

(57) ABSTRACT

Methods and systems for remote support of autonomous operation of vehicles have been disclosed. State indicators are generated by a first state display based on state data from a portion of vehicles assigned to a respective first level control station. A second state display is generated for a second control station and displays state indicators for the state data of the vehicles. A remote support interface including the first state display and image data received from a first vehicle of the vehicles is generated. Instruction data to the first vehicle is transmitted using the remote support interface (Continued)

and based on an indication that the first vehicle needs remote support, the instruction data modifying the autonomous operation of the first vehicle. A workload between the first level control stations is allocated by assigning the vehicles using the state indicators of the second state display.

14 Claims, 14 Drawing Sheets

(52) U.S. Cl.
CPC ............... *G08G 1/13* (2013.01); *G08G 1/207* (2013.01); *G05D 2201/0213* (2013.01)

(58) Field of Classification Search
USPC ...... 701/2, 23, 206, 408; 340/905, 910, 915, 340/933, 935
See application file for complete search history.

(56) References Cited

U.S. PATENT DOCUMENTS

| | | | |
|---|---|---|---|
| 2015/0039157 A1* | 2/2015 | Wolfe | G06F 17/00 701/2 |
| 2015/0248131 A1* | 9/2015 | Fairfield | G05D 1/0044 701/2 |
| 2015/0254986 A1* | 9/2015 | Fairfield | G08G 1/22 707/687 |
| 2017/0192423 A1* | 7/2017 | Rust | G05D 1/0038 |
| 2019/0039616 A1* | 2/2019 | Leff Yaffe | B60W 30/16 |

FOREIGN PATENT DOCUMENTS

| | | |
|---|---|---|
| JP | 2016-095851 A | 5/2016 |
| JP | 5957744 B1 | 7/2016 |
| JP | 5957745 B1 | 7/2016 |
| WO | 2013-128920 A1 | 9/2013 |

* cited by examiner

AUTONOMOUS VEHICLE REMOTE SUPPORT MAPPING INTERFACE

CROSS-REFERENCE TO RELATED APPLICATION(S)

This application claims priority to and the benefit of U.S. Provisional Application Ser. No. 62/428,026, filed Nov. 30, 2016, the entire disclosure of which is hereby incorporated by reference.

TECHNICAL FIELD

This application relates to an autonomous vehicle mapping interface, including methods, apparatuses, systems, and non-transitory computer readable media for remote support and tele-operation of vehicles, including autonomous vehicles, using the mapping interface.

BACKGROUND

Traditional traffic control management is centered on dealing with an infrastructure that is only partly subject to control by human operators. For example, human driven vehicles are mostly beyond the reach of operators except in the form of communication with the driver (e.g. providing road-side assistance instructions). Autonomous vehicles enable operators to remotely control and support the autonomous vehicles.

SUMMARY

Disclosed herein are aspects, features, elements, implementations, and implementations for remote support of vehicles.

In an implementation, a remote support apparatus is provided. The remote support apparatus comprises a memory and a processor configured to execute instructions stored in the memory to: receive state data from vehicles, generate a first map display including a representation of a geographical area and vehicle map indicators representing a portion of the vehicles within the geographical area, generate a first state display including a representation of the portion of the vehicles as state indicators, generate a remote support interface including the first state display and image data received from a first vehicle of the portion of vehicles, wherein the remote support interface is responsive to an input signal to a first state indicator of the first vehicle from the first state display; and transmit instruction data to the first vehicle to modify an autonomous operation of the first vehicle based on the input signal to the remote support interface.

In an implementation, a remote support apparatus is provided. The remote support apparatus comprises a memory and a processor configured to execute instructions stored in the memory to: receive state data from vehicles, rank the vehicles based on a level of urgency for remote support of the vehicles, the level of urgency determined using the state data, generate a first state display that displays the state data of at least some of the vehicles as respective state indicators arranged based on the level of urgency, generate a remote support interface including the first state display and image data received from a first vehicle of the at least some of the vehicles, the remote support interface responsive to an input signal to a first state indicator of the first vehicle from the first state display, and transmit a signal to the first vehicle using the remote support interface.

In an implementation, a method for remote support of autonomous operation of vehicles is provided. The method comprises receiving state data from the vehicles, generating, for first level control stations, a respective first state display that displays the state data from a portion of the vehicles assigned to a respective one of the first level control stations as respective state indicators, generating, for a second level control station, a second state display that displays the state data of the vehicles, generating a remote support interface including the first state display and image data received from a first vehicle of the vehicles; transmitting, using the remote support interface, instruction data to the first vehicle based on an indication that the first vehicle needs remote support, the instruction data, once received by the first vehicle, modifying autonomous operation of the first vehicle, and allocating a workload between the first level control stations by assigning the vehicles using the state indicators of the second state display.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
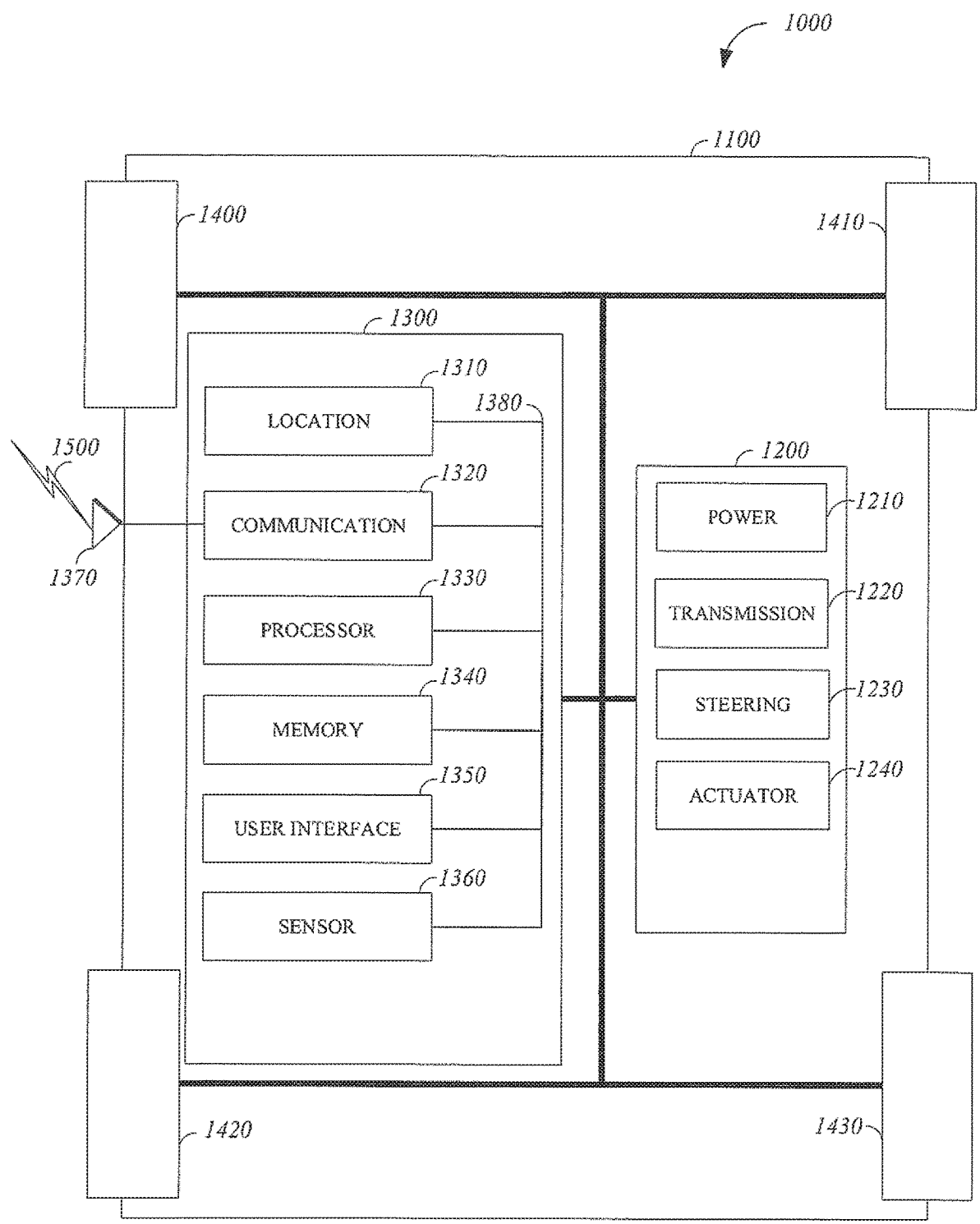
FIG. 1 is a diagram of an example of a portion of a vehicle in which the aspects, features, and elements disclosed herein may be implemented.

Managing large numbers of vehicles, including autonomous vehicles, often results in the creation and processing of a correspondingly large amount of data. Much of this data ends up being viewed and used by the human operators tasked with management of the vehicles. As such, the way in which the data is organized and distributed to operators can affect the effectiveness with which that the operators use the data to manage and provide remote support to the vehicles.

The disclosed technology provides a more effective interface for operator interaction with vehicles, including an enhanced way of generating indicators on a remote operator interface, so that the vehicles can be arranged according to their priority level (e.g. the urgency with which assistance is requested by a vehicle) or other aggregated data and factors. In this way, the operators tasked with managing the vehicles can efficiently view and interact with relevant data. The disclosed technology offers a streamlined way for an operator to assist a vehicle, update the vehicle's assistance state (e.g. issue resolved), and move on to the next vehicle that requires assistance. The information (including status or state information) of the vehicle can be aggregated into various indicators that display pertinent information related to the vehicles (e.g., travel time remaining, number of passengers, health of the car). The indicators can then be assigned to various control stations managed by vehicle managers. The assignment can be done manually by a fleet manager or can be done automatically using machine learning techniques or aggregated historical information.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

U.S. patent application Ser. No. 15/463,242, filed on Mar. 20, 2017, entitled "OBJECT MANAGEMENT DISPLAY," is incorporated herein by reference in its entirety.

To describe some implementations in greater detail, reference is made to the following figures.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/

1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
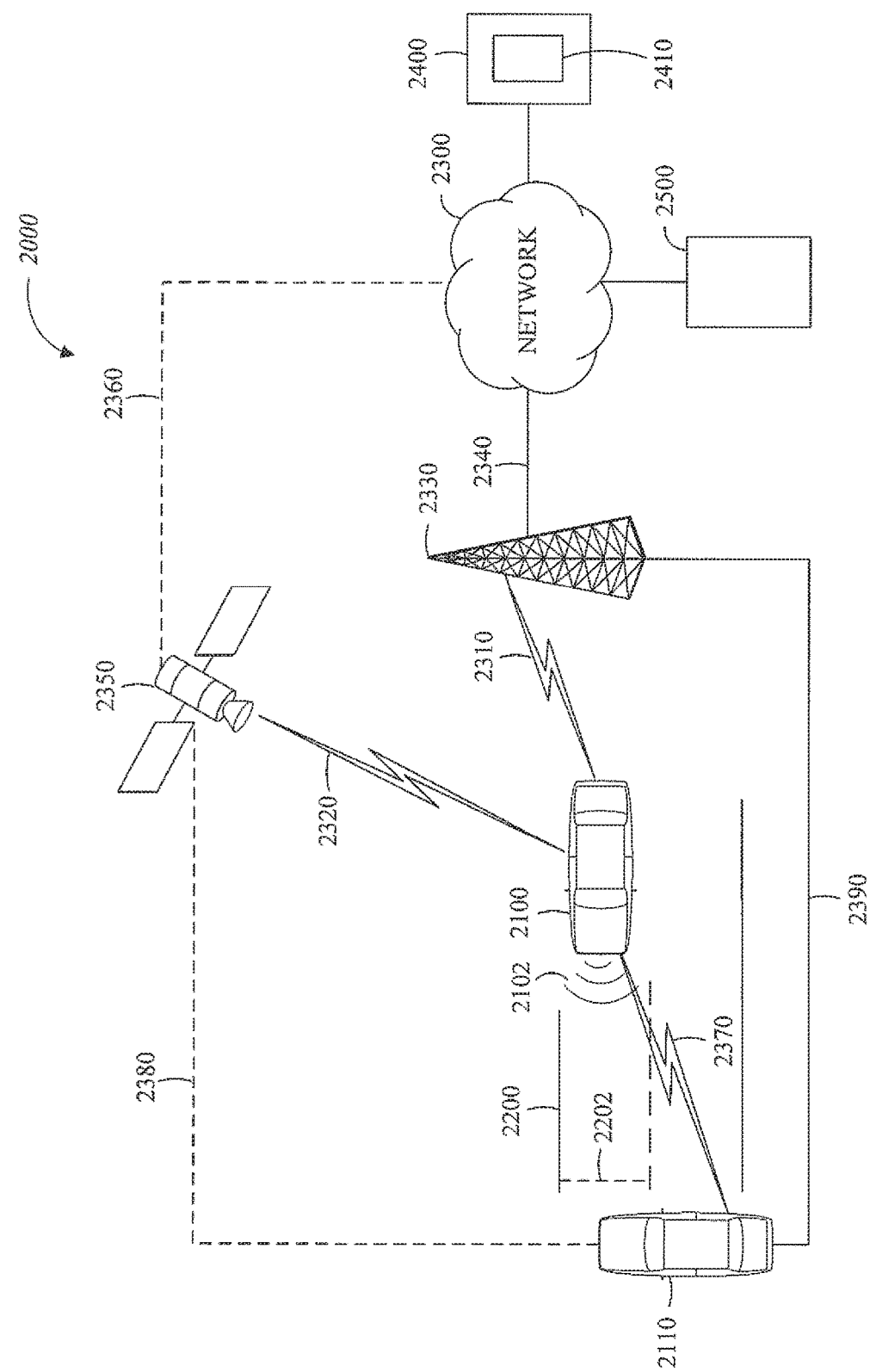
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
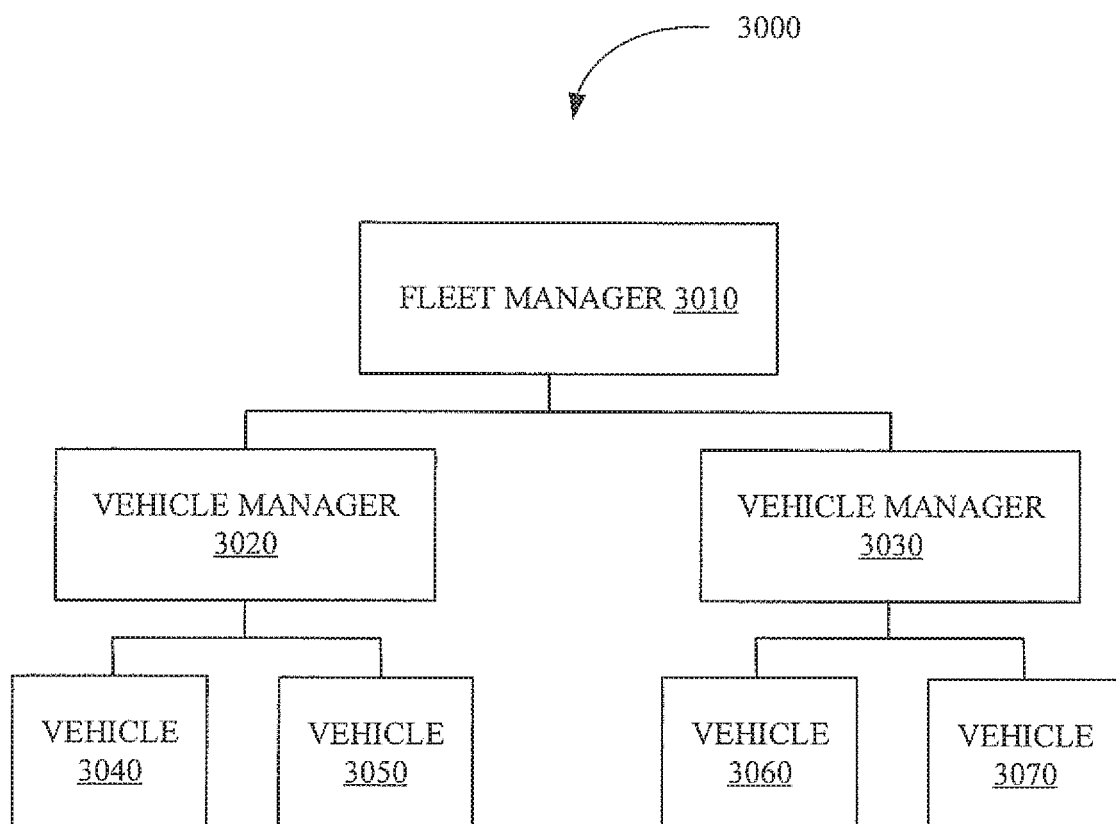
FIG. 3 is a block diagram illustrating a remote vehicle assistance center in accordance with the present disclosure.

FIG. 3 is a block diagram illustrating a remote vehicle assistance center 3000 according to this disclosure. The remote vehicle assistance center 3000 includes a fleet manager 3010, a plurality of vehicle managers including but not limited to a vehicle manager 3020 and a vehicle manager 3030, and a plurality of vehicles including but not limited to vehicles 3040, 3050, 3060, and 3070.

The fleet manager 3010 can include an apparatus including some or all of the features of the controller 1300 shown in FIG. 1. The fleet manager 3010 can monitor and coordinate vehicle managers, including the vehicle managers 3020/3030 as well as the movement of vehicles, including autonomous vehicles, and the vehicles 3040/3050/3060/3070. Monitoring and coordinating the vehicle managers can include any of: assigning, allocating, or deallocating, vehicles to the vehicle managers; reviewing and monitoring performance data of the vehicle managers; and assigning vehicle managers to a geographic area. In an implementation, there can be multiple fleet managers, who may in turn be managed or under the authority of other fleet managers.

The vehicle manager 3020 can monitor the state or condition of vehicles, including the vehicle 3040 and the vehicle 3050. As illustrated in FIG. 3, the vehicle manager 3020 has been assigned vehicle 3040 and vehicle 3050. The assignment of vehicles to a vehicle manager can be performed by a fleet manager such as the fleet manager 3010.

The vehicle manager 3030 can monitor the state or condition of vehicles, including the vehicle 3060 and the vehicle 3070. As illustrated in FIG. 3, the vehicle manager 3030 has been assigned vehicle 3060 and vehicle 3070. The assignment of vehicles to a vehicle manager can be performed by a fleet manager such as the fleet manager 3010. The assignment of vehicles to a vehicle manager can also be automated using machine learning techniques.

In an implementation, the vehicle managers can cluster or group the vehicles, establish communication with occupants in the vehicle, remotely operate the vehicles, and coordinate the movement of the vehicles through a transportation network or around various obstacles such as traffic congestion. The vehicle managers can interact with other vehicle managers to aid in the monitoring and management of the vehicles.

The vehicles including the vehicle 3040/3050/3060/3070 comprise vehicles such as the vehicle 2100 as shown in FIG. 2, that are being monitored or coordinated by the fleet manager 3010. The vehicles can be operated autonomously or by a human driver and can exchange (send and receive) vehicle data relating to the state or condition of the vehicle and its surroundings including any of: vehicle velocity; vehicle location; vehicle operational state; vehicle destination; vehicle route; vehicle sensor data; external object velocity; and external object location.

Figure 4:
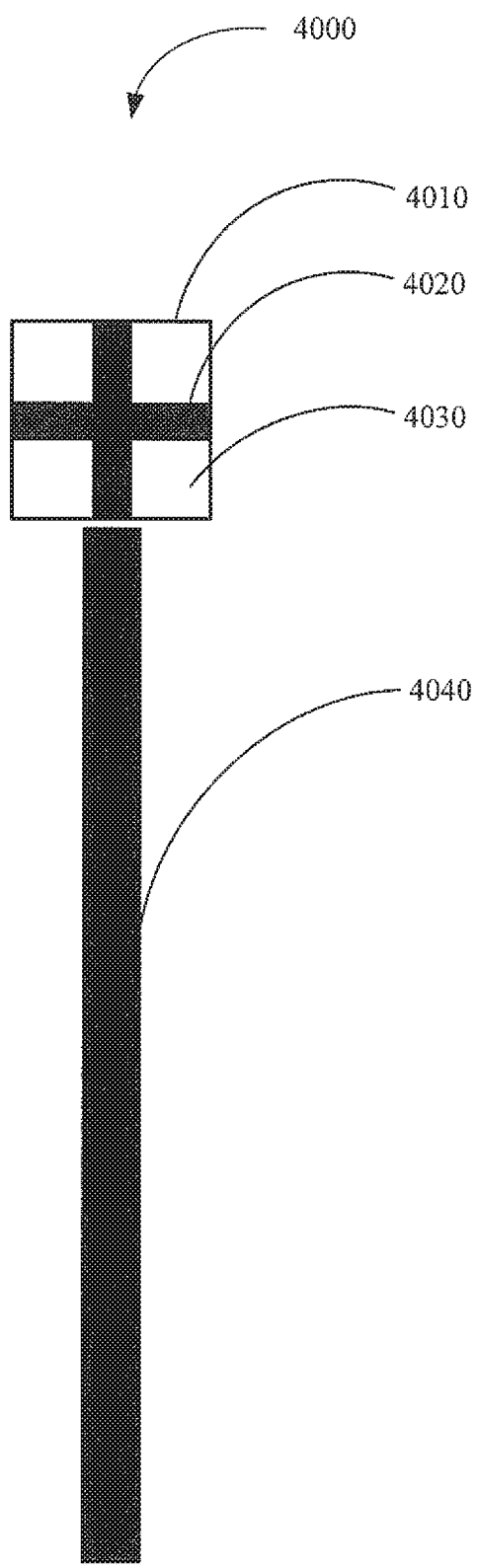
FIG. 4 is a diagram illustrating an example of a vehicle indicator for use in an interface in accordance with the present disclosure.

FIG. 4 is a diagram illustrating an example of a vehicle indicator 4000 for use in an interface including a fleet manager interface. The vehicle indicator 4000 includes a task state indicator 4010, a vehicle mode indicator 4020, a vehicle occupancy indicator 4030, and a temporal state indicator 4040.

The task state indicator 4010 can be used to indicate a task that is being performed by a vehicle or that is assigned to the vehicle including any of: travelling to a pickup destination, including travelling to a destination to pick up one or more passengers or cargo; travelling to a drop-off destination, including travelling to a destination to drop off one or more passengers or cargo; travelling to a maintenance destination, including travelling to a destination at which maintenance or repairs can be performed on the vehicle; and travelling to a refueling destination, including travelling to a destination to refuel the vehicle including petroleum stations or electrical charging stations.

The characteristics of the task state indicator 4010, including the shape and color, can correspond to the task that is being performed by the vehicle. For example, the task state indicator 4010 is shown as a square in FIG. 4, which can indicate, for example, that the vehicle is travelling to a pick up destination. In an implementation, a circular shape of the task state indicator 4010 can indicate that the vehicle is travelling to a drop-off destination. Different shapes and colors can indicate different tasks being performed by the vehicle.

The vehicle mode indicator 4020 can be used to indicate whether the vehicle is operating in any of: an autonomous mode, including a mode in which the vehicle directs itself or the vehicle is being directed remotely by a computing device; a directed mode, including a mode in which a human operator is directing the vehicle from a remote location; a manual mode, including a mode in which a human operator is operating the vehicle from within the vehicle; and a semi-autonomous mode, including a mode in which the vehicle can switch between the autonomous mode and the manual mode based on the state of the vehicle (e.g. assistive braking can activate when a proximity and acceleration threshold is exceeded) and a mode in which the vehicle is simultaneously being controlled using autonomous features and human operation. For example, the vehicle mode indicator 4020 is shown as a cross in FIG. 4, which can indicate, for example, any of the aforementioned modes.

The vehicle occupancy indicator 4030 can be used to indicate any of: whether the vehicle contains one or more passengers; and the state of the passengers in the vehicle. In an implementation, an occupied vehicle is indicated by the vehicle occupancy indicator 4030 being in a filled state (e.g. the area inside the vehicle occupancy indicator 4030 is the same color as the border around the task state indicator 4010).

The characteristics of the vehicle occupancy indicator 4030, including the color, can be used to indicate an issue associated with the vehicle including any of a passenger issue, including a request for assistance from a passenger inside the vehicle, a traffic issue, including issues relating to traffic congestion, traffic accidents, and construction, a decision issue, including issues relating to a decision that can be made by a vehicle manager regarding whether to take control over the vehicle, reroute the vehicle, establish communication with the vehicle, or indicate that an action with respect to the vehicle has been completed, a physical issue with the state of the vehicle, including issues relating to the operational state of the vehicle (e.g. engine state, fuel state). In an implementation, a default color can be used to indicate that the vehicle is operating in a normal state and that no issues with the vehicle are pending.

The temporal state indicator 4040 can be used to indicate the temporal state of the vehicle in relation to an expected or predicted temporal state. In an implementation, the color of the temporal state indicator 4040 can indicate whether the vehicle is ahead of a scheduled time or behind a scheduled time.

The length of the temporal state indicator 4040 can indicate a magnitude of deviation from the expected or predicted temporal state. The length of the temporal state indicator 4040 can be proportional to the magnitude of the deviation from the expected or predicted temporal state (e.g. directly proportional, inversely proportional, exponentially proportional, logarithmic proportionality).

In another implementation, the length of the temporal state indicator 4040 can be disproportionate with respect to the deviation from the expected or predicted temporal state (e.g. a one-third length indicating a less than five-minute deviation, a two-third length indicating a deviation of more than five minutes and less than fifteen minutes, and a full-length indicating a deviation of greater than fifteen minutes). Other characteristics of the temporal state indicator 4040 can be used to indicate the state of the vehicle, for example, a red color could indicate that the vehicle is behind a scheduled time and a green color could indicate that the vehicle is ahead of a scheduled time.

Figure 5:
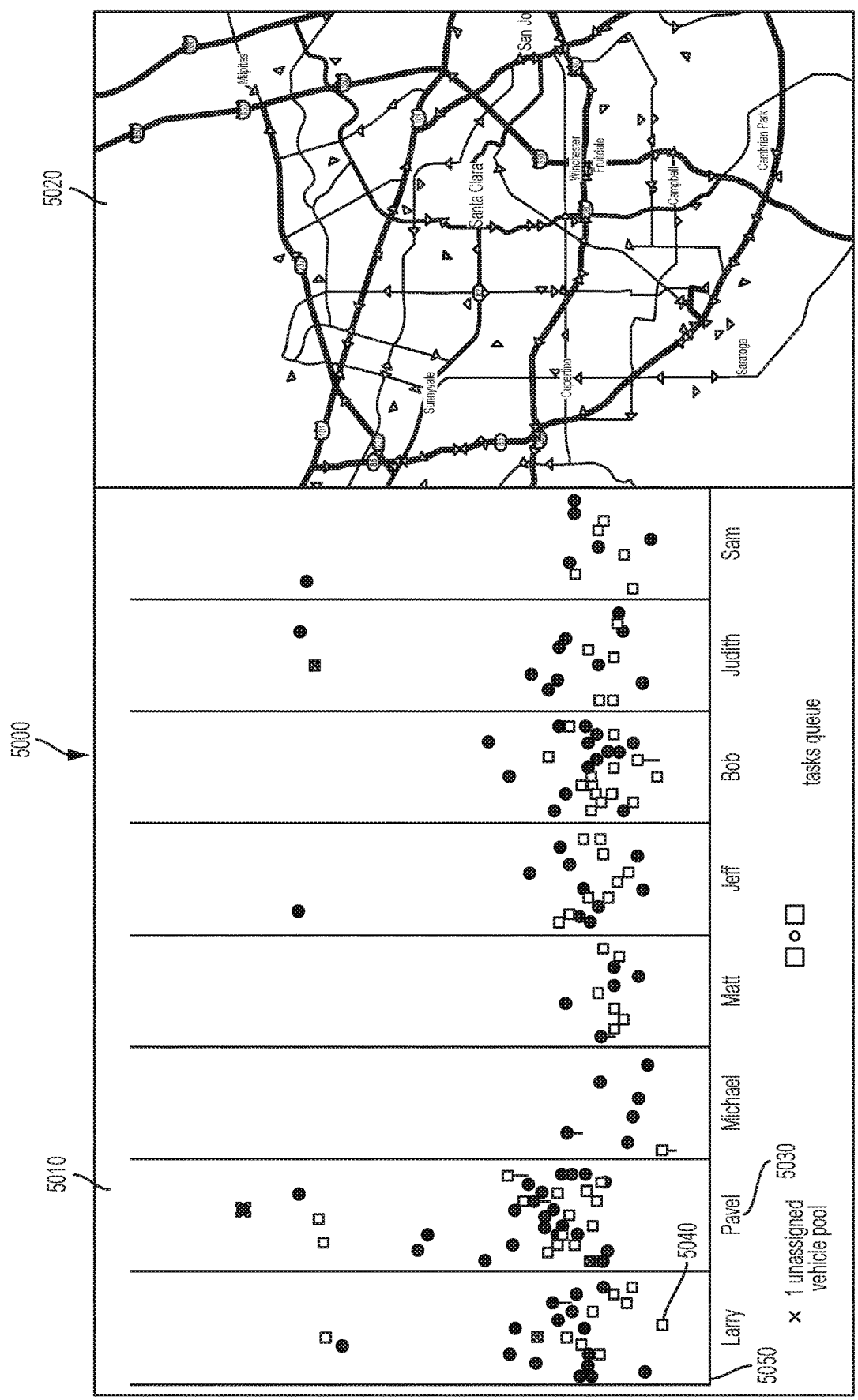
FIG. 5 is a diagram illustrating an example of a fleet manager interface in accordance with the present disclosure.

FIG. 5 is a diagram illustrating an example of a fleet manager interface 5000. The fleet manager interface 5000 can be generated based on one or more instructions that are executable on a computing apparatus, including the controller apparatus 2410 shown in FIG. 2, and which can be stored in a memory of a computing apparatus, including the controller apparatus 2410.

For example, the fleet manager interface 5000 can be generated by the controller apparatus 2410, based on instructions that are interpreted by a client computing device that accesses the controller apparatus 2410 through a computer network. The client computing device can then generate a representation of the fleet manager interface 5000 on a display device.

The fleet manager interface 5000 includes a fleet manager portion 5010, a map portion 5020, a vehicle manager indicator 5030, a vehicle indicator 5040, and a vehicle manager assignment queue 5050, any of which can be based on data associated with the state of physical objects including but not limited to at least one of vehicles, roadways, buildings, and pedestrians.

The fleet manager portion 5010 includes a representation of objects that are being monitored or tracked by the fleet manager and/or the vehicle managers including the association of vehicle managers to vehicles. The objects can include vehicles, including the vehicle 2100 as shown in FIG. 2. The objects can be represented as indicators such as the vehicle indicator 5040, which can be generated as a static image or moving image such as the vehicle indicator 4000 as shown in FIG. 4. Further, the fleet manager portion 5010 can receive input including any of touch inputs, voice inputs, and inputs from an input device. By way of example, vehicle indicators including the vehicle indicator 5040 can be selected by an operator, such as a vehicle manager. Selection of the vehicle indicators can generate data about the state or condition of the respective vehicle represented by the vehicle indicators (e.g. the selected vehicle indicator can indicate whether the vehicle is functioning properly or will arrive at a destination on time).

The map portion 5020 includes a representation of a geographical area including objects within a predefined geographical area. In an implementation, the predefined geographical area can include a geographical area corresponding to the geographical area that includes all or at least some portion of the vehicles that are being monitored by one of the vehicle managers. The objects within the geographical area can include any of the vehicles, and the external objects including roadways, buildings, and pedestrians. The map portion 5020 can receive input including any of touch inputs, voice inputs, and inputs from an input device. The input to the map portion can generate data about the state or condition of the selected vehicles or external objects.

In an implementation, the map portion 5020 contains the same representation of objects that are displayed on the fleet manager portion 5010. In another implementation, the number and type of objects displayed between the fleet manager portion 5010 and the map portion 5020 can differ. For example, the vehicle manager can zoom into a particular geographical area thus displaying only a subset of the objects or vehicles that are represented on the fleet manager portion 5010.

The vehicle manager indicator 5030 is a representation of an identifier for a vehicle manager. Each of the vehicle managers displayed on the fleet manager interface 500 includes a separate vehicle manager indicator. The vehicle manager can be associated with one or more vehicles, which can be distributed or apportioned by the fleet manager or dynamically using machine learning techniques. For example, the fleet manager can modify the number of vehicles assigned to a vehicle manager including any of adding or removing vehicles and transferring one or more vehicles from one vehicle manager to another vehicle manager.

The vehicle indicator 5040 is a representation of the state or condition of an autonomous vehicle, the state including any of a vehicle task, vehicle occupancy, vehicle operational mode (e.g. autonomous operation or manual operation), and a vehicle issue, including but not limited to an issue with the operational state of the vehicle. The vehicle indicator 5040 can include various colors, shapes, patterns, text, pictograms, or any combination thereof, to represent aspects of the state or condition of the vehicle indicator. As an example, the vehicle indicator 5040 can represent an autonomous vehicle that is travelling to a destination in order to pick up a passenger. Further, the vehicle indicator 5040 can represent an autonomous vehicle that is carrying a passenger and travelling to a destination in order to drop the passenger off.

The vehicle manager assignment queue 5050 is a representation of the vehicles that are assigned to a vehicle manager. The vehicles can be assigned to the vehicle manager assignment queue 5050 by the fleet manager or by the vehicle managers themselves or automatically using machine learning techniques. For example, one vehicle manager may realize that they are monitoring too many vehicles and can assign a subset of those vehicles to another vehicle manager that is determined to have additional monitoring capacity. As shown in FIG. 5 the vehicle indicators (e.g., the vehicle indicator 5040) within the vehicle manager assignment queue 5050 are assigned to the vehicle manager associated with the vehicle manager indicator 5030 "Larry." This vehicle manager indicator can represent the real name of the vehicle manager or a username or another identifier.

Figure 6:
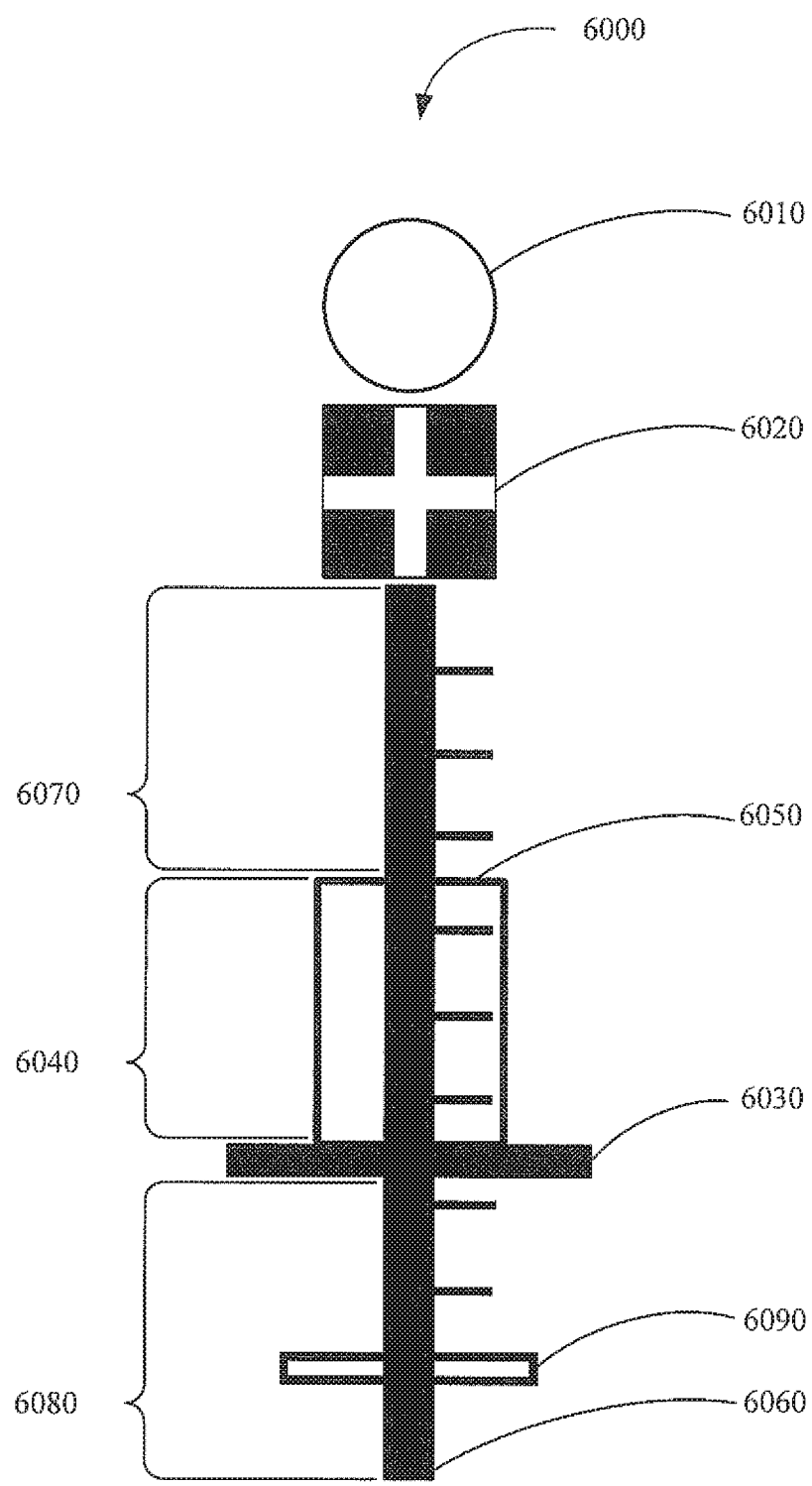
FIG. 6 is a diagram illustrating an example of a vehicle indicator for use in an interface in accordance with the present disclosure.
Figure 7:
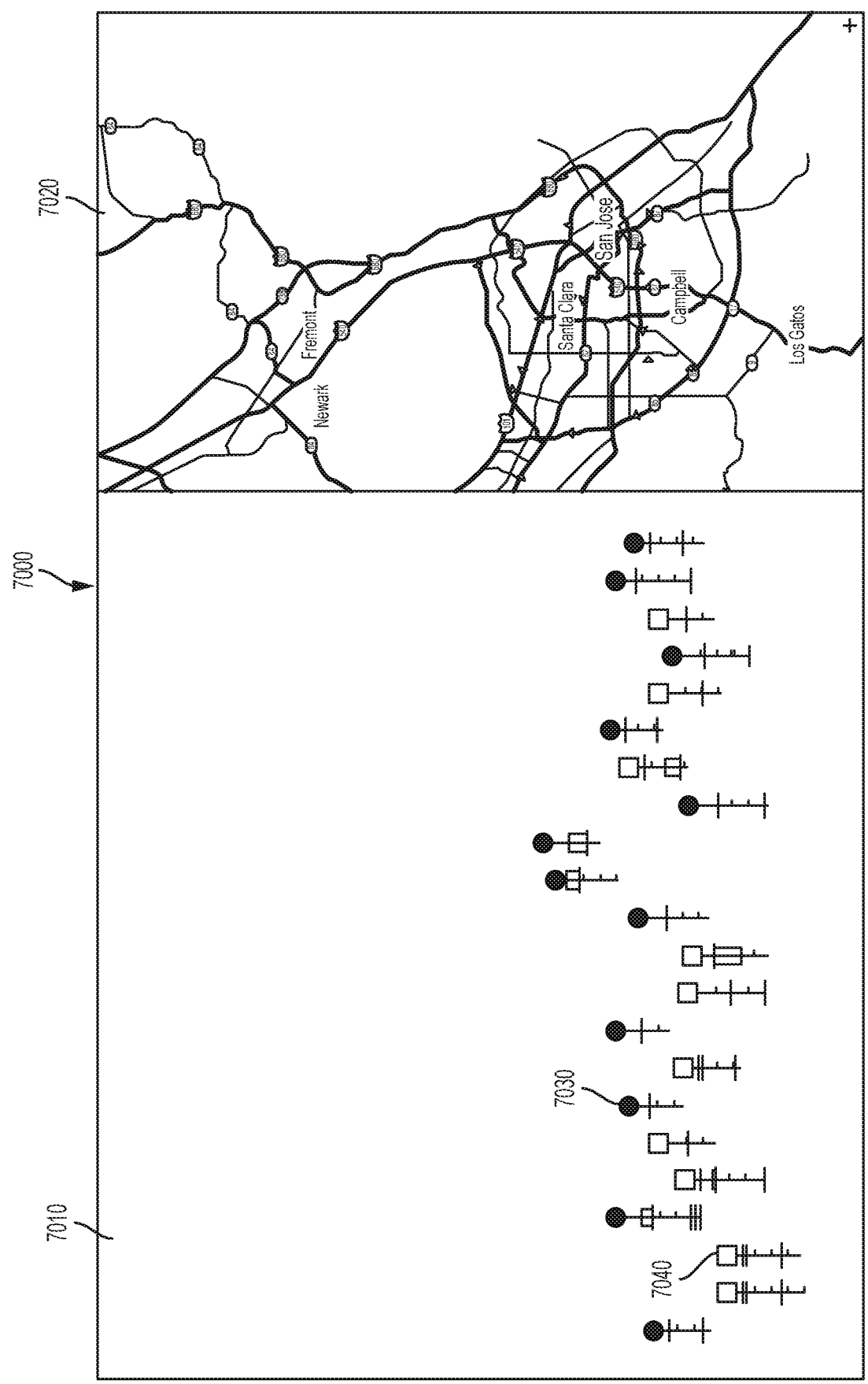
FIG. 7 is a diagram illustrating an example of a vehicle manager interface in accordance with the present disclosure.
Figure 9:
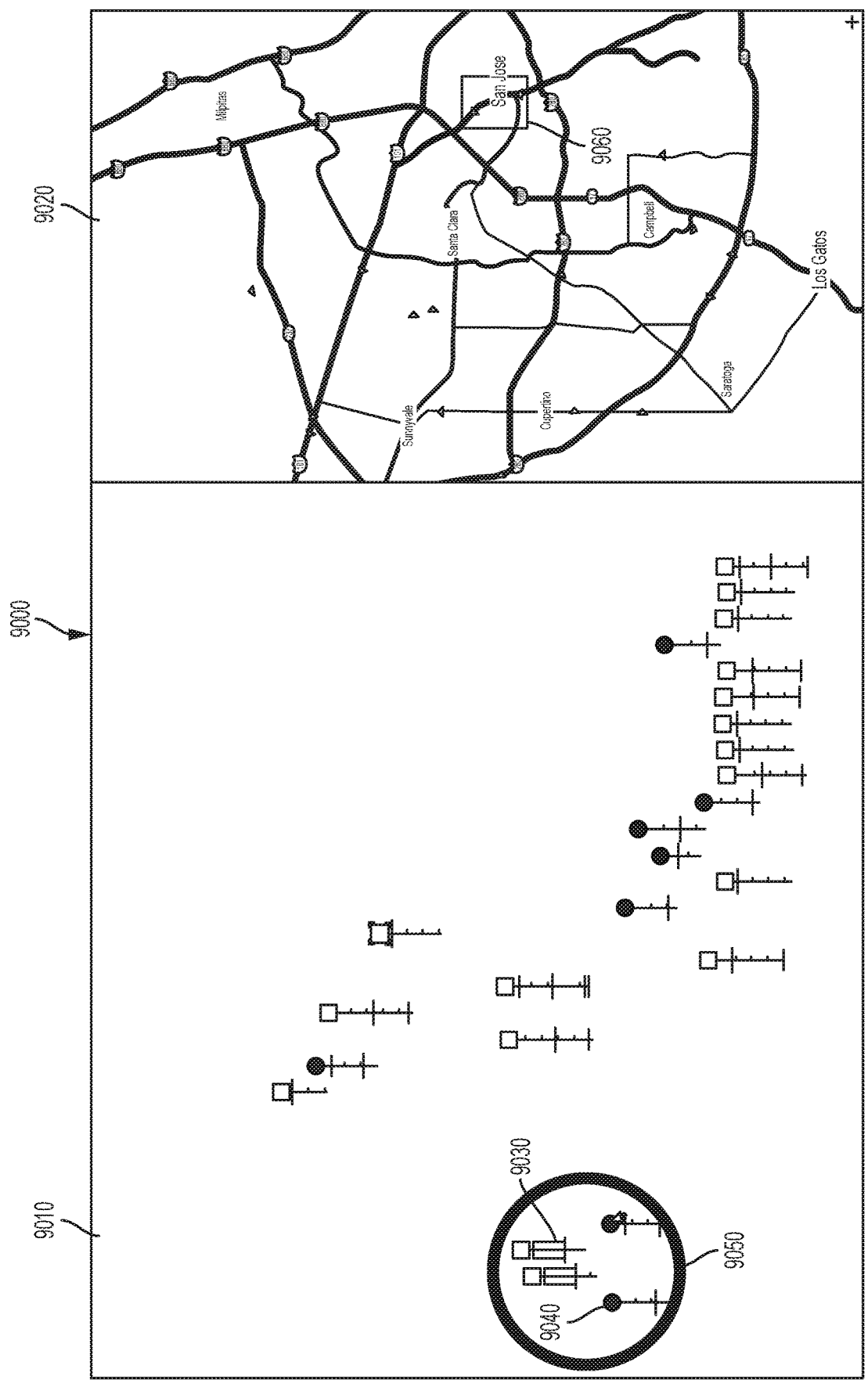
FIG. 9 is a diagram illustrating an example of a vehicle manager interface in accordance with the present disclosure.

FIG. 6 is a diagram illustrating an example of a vehicle indicator 6000 for use in an interface including the fleet manager interface 500 illustrated in FIG. 5, a vehicle manager interface 7000 illustrated in FIG. 7 or a vehicle manager interface 9000 illustrated in FIG. 9.

The vehicle indicator 6000 includes a next task indicator 6010, a current task indicator 6020, an actual progress indicator 6030, a deviation magnitude indicator 6040, an expected progress indicator 6050, a time scale 6060, a time to completion 6070, an elapsed time 6080, and a time compression indicator 6090.

The next task indicator 6010 can be used to indicate a task that is assigned to the vehicle and that is not currently being performed. The next task indicator 6010 can indicate a task that will be performed following performance of a current task (e.g. a current task associated with the current task indicator 6020). For example, the next task indicator 6010 can indicate that a drop off will occur after the current task associated with the current task indicator 6020 is completed. In an implementation, an interaction with the next task indicator 6010 (e.g. selecting the next task indicator 6010) can show a description of the task that will be performed next.

The current task indicator 6020 can be used to indicate a task that is currently being performed by a vehicle. For example, the current task indicator 6020 can include picking up a passenger at a designated location. In an implementation, an interaction with the current task indicator 6020 (e.g. selecting the current task indicator 6020) can show a description of the task that is currently being performed.

The next task indicator 6010 and the current task indicator 6020 can be associated with tasks including but not limited to any of, travelling to a pickup destination, including travelling to a destination to pick up one or more passengers or cargo, travelling to a drop-off destination, including travelling to a destination to drop off one or more passengers or cargo, travelling to a maintenance destination, including travelling to a destination at which maintenance or repairs can be performed on the vehicle; and travelling to a refueling destination, including travelling to a destination to refuel the vehicle including petroleum stations or electrical charging stations.

The shape of the next task indicator 6010 or the current task indicator 6020 can correspond to the task that is being performed by the vehicle. For example, the next task indicator 6010, is shown as a circle in FIG. 6, which indicates that the vehicle is travelling to a drop off destination. The circular shape of the current task indicator 6020 can indicate that the vehicle is travelling to a pick up destination. The shape can include but is not limited to circles, squares, triangles, rectangles, etc.

A pattern (e.g. cross shape, zig-zag) in the next task indicator 6010 or the current task indicator 6020 can indicate whether the vehicle is operating in any of an autonomous mode, including a mode in which the vehicle directs itself or the vehicle is being directed remotely by a computing device, a directed mode, including a mode in which a human operator is directing the vehicle from a remote location, a manual mode, including a mode in which a human operator is operating the vehicle from within the vehicle, and a semi-autonomous mode, including a mode in which the vehicle can switch between the autonomous mode and the manual mode based on the state of the vehicle and a mode in which the vehicle is simultaneously being controlled using autonomous features and human operation. For example, the vehicle mode indicator 4020 is shown as a cross in FIG. 4, which can indicate, for example, any of the aforementioned modes.

The characteristics, including a fill, of the next task indicator 6010 or the current task indicator 6020 can be used to indicate whether the vehicle contains one or more passengers. In an implementation, an occupied vehicle is indicated by the next task indicator 6010 or the current task indicator 6020 being in a filled state. For example, no fill (e.g. no pattern, no shading, and a light color) could be used to indicate that the vehicle does not contain occupants.

The color of the next task indicator 6010 or the current task indicator 6020 can be used to indicate an issue associated with the vehicle including any of a passenger issue, including a request for assistance from a passenger inside the vehicle, a traffic issue, including issues relating to traffic congestion, traffic accidents, and construction, a decision issue, including issues relating to a decision that can be made by a vehicle manager regarding whether to take control over the vehicle, a physical issue with the state of the vehicle, including issues relating to the operational state of the vehicle (e.g. engine state, fuel state). In an implementation, a default color can be used to indicate that the vehicle is operating in a normal state and that no issues with the vehicle are pending.

The actual progress indicator 6030 indicates the actual portion of a route distance that has been traversed, or time that has passed, on the way to a destination. For example, if the progress indicator is at the halfway point of the time scale 6060, half of the route distance has been completed, or half of the estimated travel time has passed.

The expected progress indicator 6050 indicates a portion of a route distance that was estimated to have been completed by the vehicle by the current time and can include a portion of the estimated time to travel to a destination or a portion of the estimated distance that has been traversed by the vehicle. The deviation magnitude indicator 6040 indicates the portion of the route distance or the portion of the travel time by which the expected progress time (indicated by the expected progress indicator 6050) deviates from the actual progress time (indicated by the actual progress indicator 6030).

The time scale 6060 indicates the total travel time or total travel distance to complete a route for the vehicle. For example, if the time scale 6060 is representative of a total travel time of thirty minutes, half of the time scale 6060 is fifteen minutes. In the event that the time scale 6060 is for a longer time period, the time compression indicator 6090 can indicate that a portion of the time scale 6060 that is not proportional to the remaining part of the time scale 6060 has elapsed. For example, the time compression indicator 6090 can indicate that half of the time scale 6060 has elapsed. By way of example, the elapsed time 6080 indicates the travel time that has elapsed on the way to a destination.

Total completion time for a route can be represented by a length of the time scale 6060 which includes the length of the deviation magnitude indicator 6040, the length of the time to completion 6070, and the length of the elapsed time 6080. By way of example, the time to completion 6070 indicates the remaining travel time before the vehicle arrives at the destination or completes the associated/assigned task.

FIG. 7 is a diagram illustrating an example of a vehicle manager interface 7000. The vehicle manager interface 7000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 7000 can be generated by the controller apparatus 2410, based on instructions that are interpreted by a client computing device that accesses the controller apparatus 2410 through a computer network. The client computing device can then generate a representation of the vehicle manager interface 7000 on a display device.

The vehicle manager interface 7000 includes a vehicle manager portion 7010, a map portion 7020, a vehicle indicator 7030, and a vehicle indicator 7040, any of which can be based on data associated with the state of physical objects including any of vehicles and external objects including but not limited to pedestrians, cyclists, roadways, and buildings.

The vehicle manager portion 7010 includes a representation of objects that are being monitored or tracked by the vehicle manager utilizing the vehicle manager interface 7000. A plurality of vehicle managers can be monitoring a plurality of vehicles each with their own specific interface. The objects can include vehicles, including the vehicle 2100 shown in FIG. 2. The objects can be represented as indicators such as the vehicle indicator 7030, which can be generated as a variety of images including but not limited to as a static image, a dynamic image, a moving image, a live photo or video feed, or any combination thereof. Further, the vehicle manager portion 7010 can receive input including any of touch inputs, voice inputs, and inputs from an input device.

The map portion 7020 includes a representation of a geographical area including objects within the geographical area. The objects within the geographical area can include any of the vehicles and the external objects including roadways, buildings, cyclists, and pedestrians. In an implementation, the map portion 7020 can have similar or different objects represented as the objects represented by the vehicle manager portion 7010.

The vehicle indicator 7030 and the vehicle indicator 7040 are representations of the state or condition of an autonomous vehicle, including any of a vehicle task, vehicle occupancy, vehicle operational mode (e.g. autonomous operation or manual operation), and a vehicle issue, including but not limited to an issue with the operational state of the vehicle. The vehicle indicator 7030 and the vehicle indicator 7040 can include various colors, shapes, patterns, text, or pictograms, to represent aspects of the state or condition of the autonomous vehicle.

As an example, the vehicle indicator 7030 can represent an autonomous vehicle that is travelling to a destination in order to pick up a passenger. Further, the vehicle indicator 7040 can represent an autonomous vehicle that is carrying another passenger and travelling to a destination in order to drop that passenger off. The different tasks or actions that the respective autonomous vehicles are carrying out result in the graphical display differences between the vehicle indicators 7030 and 7040 (e.g., the vehicle indicator 7030 has a filled in circle and the vehicle indicator 7040 has an unfilled square).

Figure 8:
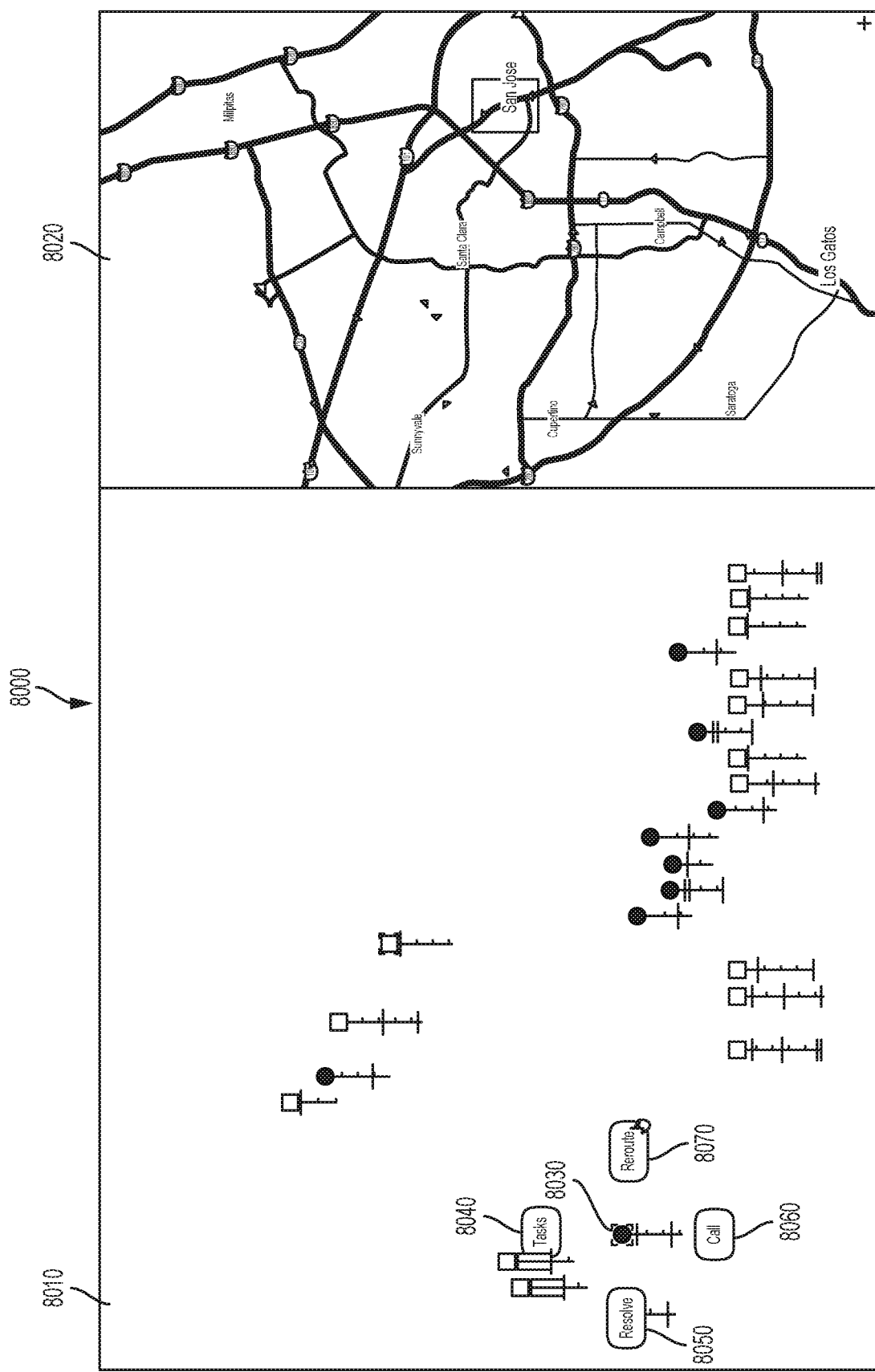
FIG. 8 is a diagram illustrating an example of a vehicle manager interface in accordance with the present disclosure.

FIG. 8 is a diagram illustrating an example of a vehicle manager interface 8000. The vehicle manager interface 8000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 8000 can be generated by the controller apparatus 2410, based on instructions that are interpreted by a client computing device that accesses the controller apparatus 2410 through a computer network. The client computing device can then generate a representation of the vehicle manager interface 8000 on a display device.

The vehicle manager interface 8000 resembles the vehicle manager interface 7000 and includes a vehicle manager portion 8010 (similar to the vehicle manager portion 7010 as shown in FIG. 7), a map portion 8020 (similar to the map portion 7020 as shown in FIG. 7), a vehicle indicator 8030, a task control 8040, a resolved control 8050, a call control 8060, and a reroute control 8070, any of which can be based on data associated with the state of physical objects including but not limited to at least one of vehicles, roadways, buildings, and pedestrians. In another implementation, the vehicle manager interface 8000 includes different control functions other than the task control 8040, the resolved control 8050, the call control 8060, and the reroute control 8070 that enable the vehicle manager to interface with and control various aspects of the respective autonomous vehicle or object being monitored or tracked.

The vehicle manager portion 8010 includes a representation of objects that are being monitored or tracked. The objects can include vehicles, including the vehicle 2100 shown in FIG. 2. The objects can be represented as indicators such as the vehicle indicator 8030, which can be generated as a static image or moving image or a different type of image. Further, the vehicle manager portion 8010 can receive input including any of touch inputs, voice inputs, and inputs from an input device. By way of example, vehicle indicators including the vehicle indicator 8030 can be selected by an operator of the vehicle manager interface 8000, such as a vehicle manager. Selection of the vehicle indicators can generate data about the state or condition of the respective vehicle represented by the vehicle indicators (e.g. the selected vehicle indicator can indicate whether the vehicle will arrive at a destination on time).

The map portion 8020 includes a representation of a geographical area including objects within the geographical area. The objects within the geographical area can include any of the vehicles and the external objects including but not limited to roadways, buildings, cyclists, and pedestrians. The map portion 8020 can receive input including any of touch inputs, voice inputs, and inputs from an input device. The input to the map portion can generate data about the state or condition of the selected vehicles or external objects. In an implementation, the map portion 8020 can have similar or different objects represented as the objects represented by the vehicle manager portion 8010.

For example, selecting a building, such as a stadium, could generate data indicating that a sporting event is taking place at the stadium within a certain time frame. Accordingly, the vehicle manager, can anticipate congestion in the vicinity of the stadium at the conclusion of the sporting event, due to the increased traffic flow resulting from patrons leaving the stadium. Therefore, the vehicle manager can reroute or change the completion time of one of the autonomous vehicles that they are monitoring and that is scheduled to carry out a specific task near the stadium at the conclusion of the sporting event.

The vehicle indicator 8030 includes a representation of the state or condition of a vehicle (e.g. an autonomous vehicle or a human driven vehicle) and includes any of a vehicle task, vehicle occupancy, vehicle operational mode (e.g. autonomous operation or manual operation), and a vehicle issue, including but not limited to an issue with the operational state of the vehicle. The vehicle indicator 8030 can include various characteristics including colors, shapes, patterns, text, or pictograms, to represent aspects of the state or condition of the vehicle indicator. As an example, the vehicle indicator 8030 can represent an autonomous vehicle that is travelling to a destination in order to pick up a passenger. Or the vehicle indicator 8030 can represent an autonomous vehicle that is carrying a passenger and travelling to a destination in order to drop the passenger off.

Any of the task control 8040, the resolved control 8050, the call control 8060, and the reroute control 8070, can be controlled or modified based on an input including any of a user input based on an input received through an input device including a tactile input device (e.g. a keyboard, mouse, or touchscreen), an audio input device (e.g. a microphone), and a visual input device (e.g. a camera). Moreover, any of the task control 8040, the task resolved control 8050, the call control 8060, and the reroute control 8070, can be controlled or modified based on instructions, such as computer program instructions (e.g. instructions to select vehicle indicators that meet pre-established criteria such as a common destination).

The task control 8040 can be used to modify the task that is associated with a vehicle. For example, the vehicle associated with the vehicle indicator 8030 may have completed a drop off. A vehicle manager can interact with the task control 8040 and modify the vehicle task to indicate that the vehicle should now pick up a passenger instead of completing a previously assigned next task. The task can be modified and/or updated while the task completion is in progress or in regards to an upcoming task. For example, the current task can be set for delivery of a package at a certain time but based on traffic conditions, the current task is updated to pick up a passenger nearby and drop them off at a location that isn't within the traffic congestion area. In another example, one of the upcoming tasks of the vehicle can be modified/updated/deleted while the vehicle is completing a current unrelated task.

The resolved control 8050 can be used to indicate that an issued related to the vehicle has been resolved or completed by the vehicle manager. For example, after a vehicle manager receives a help request from a vehicle associated with the vehicle indicator 8030 or a passenger of the vehicle, and provides assistance to the vehicle, the resolved control 8050 can be activated by the vehicle manager to indicate that the issue has been resolved and is no longer pending. In an implementation, activating the resolved control 8050 can modify vehicle data associated with the vehicle including a vehicle task urgency that includes an indication of the urgency of a vehicle request or a vehicle task (e.g. an ambulance carrying a patient to a hospital). For example, a vehicle carrying a patient in urgent need of medical help, could send a request to a vehicle manager for an optimized rerouting and once the vehicle manager takes care of this request or concludes that additional help is needed, the vehicle manager can interact with the resolved control 8050 to update the status of the request.

The call control 8060 can used to contact and communicate with the vehicle associated with the vehicle indicator 8030. For example, when the call control 8060 is activated, a vehicle manager can interact with an occupant or passenger of the vehicle associated with the vehicle indicator 8030. In an implementation, when the call control 8060 is activated, any of an audio connection or an audio and video connection (e.g., live video communication feeds) can be established with the vehicle associated with the vehicle indicator 8030.

The reroute control 8070 can be used to modify a route associated with a vehicle. For example, the vehicle associated with the vehicle indicator 8030 could be in transit to a destination via a route that will pass through heavily congested traffic. The reroute control 8070 could be used to reroute the vehicle to avoid entering the area with the heavily congested traffic. In another implementation, the reroute control 8070 can be a different type of control that provides tele-operation of autonomous vehicles FIG. 9 is a diagram illustrating an example of a vehicle manager interface 9000. The vehicle manager interface 9000 can be generated based on one or more instructions that are executable on a computing apparatus, including the controller apparatus 2410, and which can be stored in a memory of a computing apparatus, including the controller apparatus 2410.

For example, the vehicle manager interface 9000 can be generated by the controller apparatus 2410, based on instructions that are interpreted by a client computing device that accesses the controller apparatus 2410 through a computer network. The client computing device can then generate a representation of the vehicle manager interface 9000 on a display device.

The vehicle manager interface 9000 resembles the vehicle manager interface 8000 as shown in FIG. 8 and includes a vehicle manager portion 9010, a map portion 9020, a vehicle indicator 9030, a vehicle indicator 9040, a cluster control 9050, and an area selection control 9060, any of which can be based on data associated with the state of physical objects including but not limited to at least one of vehicles, roadways, buildings, and pedestrians.

The vehicle manager portion 9010 includes a representation of objects that are being monitored or tracked. The objects can include vehicles, including the vehicle 2100 shown in FIG. 2. The objects can be represented as indicators such as the vehicle indicator 9030, which can be generated as a static image or moving image or any other type of image. Further, the vehicle manager portion 9010 can receive input including any of touch inputs, voice inputs, and inputs from an input device.

By way of example, vehicle indicators including the vehicle indicator 9030 and the vehicle indicator 9040 can be selected by an operator, such as a vehicle manager. Selection of the vehicle indicators can generate data about the state or condition of the respective vehicle represented by the vehicle indicators (e.g. the selected vehicle indicator can indicate whether the vehicle will arrive at a destination on time).

The map portion 9020 includes a representation of a geographical area including objects within the geographical area. The objects within the geographical area can include any of the vehicles, and the external objects including but not limited to roadways, buildings, cyclists and pedestrians. The map portion 9020 can receive input including any of touch inputs, voice inputs, and inputs from an input device. The input to the map portion can generate data about the state or condition of the selected vehicles or external objects. For example, selecting a building, such as a stadium, could generate data indicating that a sporting event is taking place at the stadium within a certain time frame. Accordingly, the vehicle manager, can anticipate congestion in the vicinity of the stadium at the conclusion of the sporting event, due to the increased traffic flow resulting from patrons leaving the stadium and reroute the vehicle.

The vehicle indicator 9030 and the vehicle indicator 9040 are representations of the state or condition of two separate autonomous vehicles, including any of a vehicle task, vehicle occupancy, vehicle operational mode (e.g. autonomous operation or manual operation), and a vehicle issue, including an issue with the operational state of the vehicle. The vehicle indicator 9030 and the vehicle indicator 9040 can include various colors, shapes, patterns, text, or pictograms, to represent aspects of the state or condition of the vehicle indicator. As an example, the vehicle indicator 9030 can represent an autonomous vehicle that is travelling to a destination in order to pick up a passenger. Further, the vehicle indicator 9040 can represent an autonomous vehicle that is carrying another passenger and travelling to a destination in order to drop that passenger off.

The cluster control 9050 and the area selection control 9060 include a control element that can be controlled or modified based on an input including any of a user input based on an input received through an input device including a tactile input device (e.g. a keyboard, mouse, or touch-screen), an audio input device (e.g. a microphone), and a visual input device (e.g. a camera). Moreover, the cluster control 9050 and the area selection control 9060 element can be controlled or modified based on instructions, such as computer program instructions (e.g. instructions to select vehicle indicators that meet pre-established criteria such as a common destination).

The area selection control 9060 is a control element that can be controlled or modified to select a section of the map portion 9020. For example, a rectangular section of the map can be selected or highlighted by the vehicle manager in order to define that the vehicles within the geographical area of the map will be monitored and selected or clustered on the vehicle manager portion 9010 that corresponds to the selected part of the map portion 9020. The objects within the selected section of the map portion 9020 can be monitored and organized according to a cluster criteria including any of routes, destinations, and points of departure in common. As illustrated in FIG. 9, the cluster control 9050 can indicate that the vehicle indication 9030 and vehicle indication 9040 are part of a cluster group based on shared cluster criteria (e.g., they share similar routes).

Figure 10:
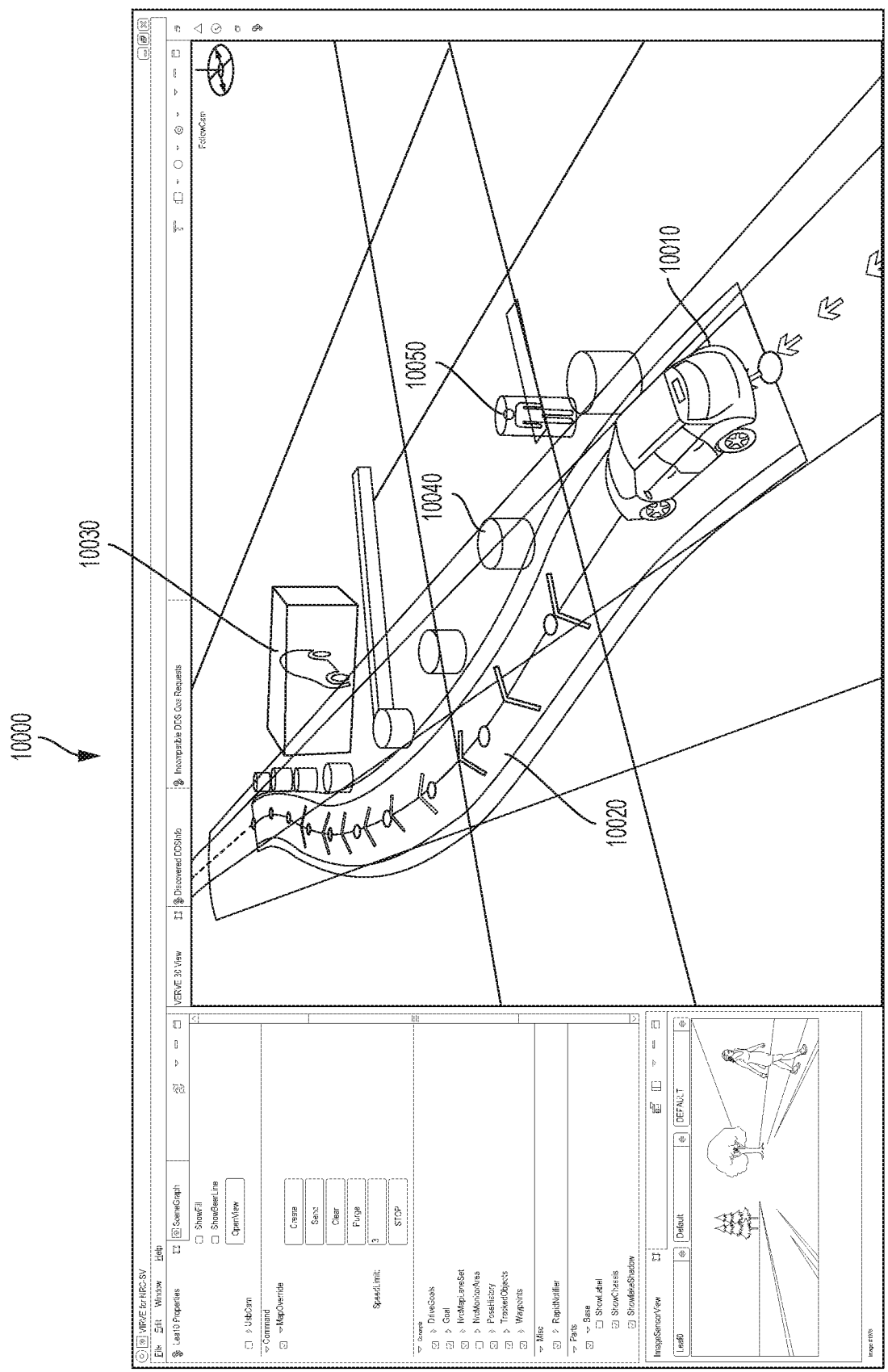
FIG. 10 is a diagram illustrating an example of a vehicle manager interface in accordance with the present disclosure.

FIG. 10 is a diagram illustrating an example of a vehicle manager interface 10000. The vehicle manager interface 10000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 10000 can be generated by the controller apparatus 2410, based on instructions that are interpreted by a client computing device that accesses the controller apparatus 2410 through a computer network. The client computing device can then generate a representation of the vehicle manager interface 10000 on a display device.

The vehicle manager interface 10000 includes a vehicle indicator 10010, a path indicator 10020, an external object indicator 10030, an obstruction indicator 10040, a pedestrian indicator 10050, any of which can be based on data associated with the state of physical objects including but not limited to at least one of vehicles, roadways, buildings, and pedestrians. A plurality of configurations of external objects, obstructions, pedestrians, and any combination thereof can be displayed on the vehicle manager interface 10000. The vehicle indicator 10010 can be used to represent a vehicle. In this example, the vehicle is represented as a three dimensional model, however the vehicle indicator 10010 can be represented in different ways including any of a two dimensional image and a pictogram, such as an icon.

The path indicator 10020 can be used to represent a path between the current vehicle location and a vehicle destination. In an implementation, a vehicle manager can guide the vehicle associated with the vehicle indicator 10010 along the path indicated by the path indicator 10020. For example, when providing remote assistance to a vehicle associated with the vehicle indicator 10010, a path indicator such as a virtual lane can be generated in order to provide a visual representation of the path that the vehicle can travel on that is illustrated by the path indicator 10020.

The external object indicator 10030 can be used to represent external objects such as other vehicles that could change the intended route of the vehicle as an example. The obstruction indicator 10040 can be used to represent external objects that can obstruct the movement of the vehicle represented by the vehicle indicator 10010. The pedestrian indicator 10050 can be used to represent an external object including a pedestrian or a cyclist or another moving object. The pedestrian indicator 10050 can be indicated with a distinctive color scheme that is different from other external objects represented by the external object indicator 10030 or the obstruction indicator 10040. In this way, pedestrians can be distinguished from other types of external objects to provide additional awareness and avoidance capabilities. In an implementation, the external object indicator 10030, the obstruction indicator 10040, and the pedestrian indicator 10050, or any combination thereof, can be represented by the same or similar type of indicator that covers all objects that could affect at least one parameter (e.g., route, travel time, etc.) of the vehicle represented by the vehicle indicator 10010.

Figure 11:
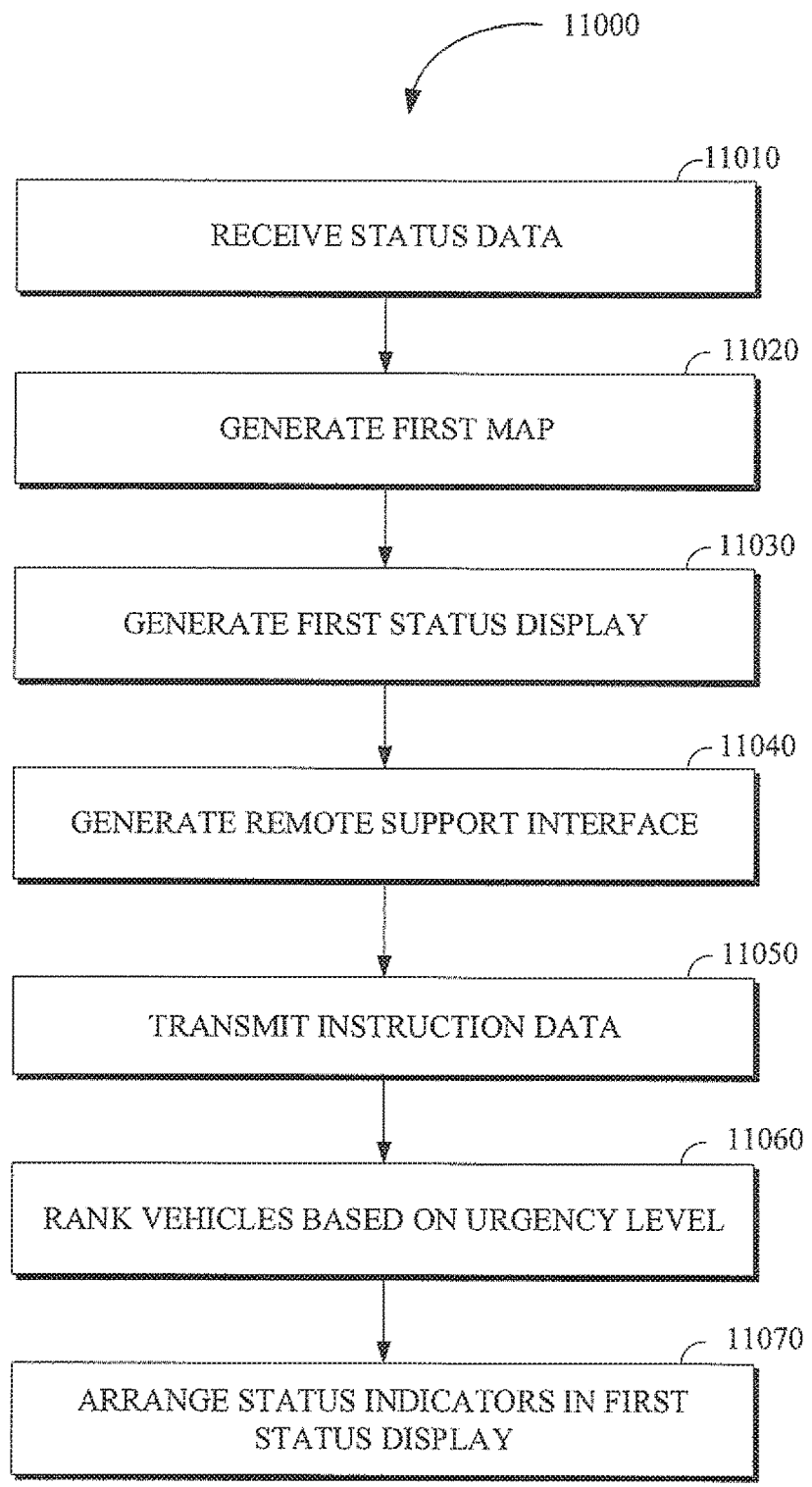
FIG. 11 is a flow chart of a technique for providing remote support of autonomous operation of vehicles in accordance with the present disclosure.
Figure 12:
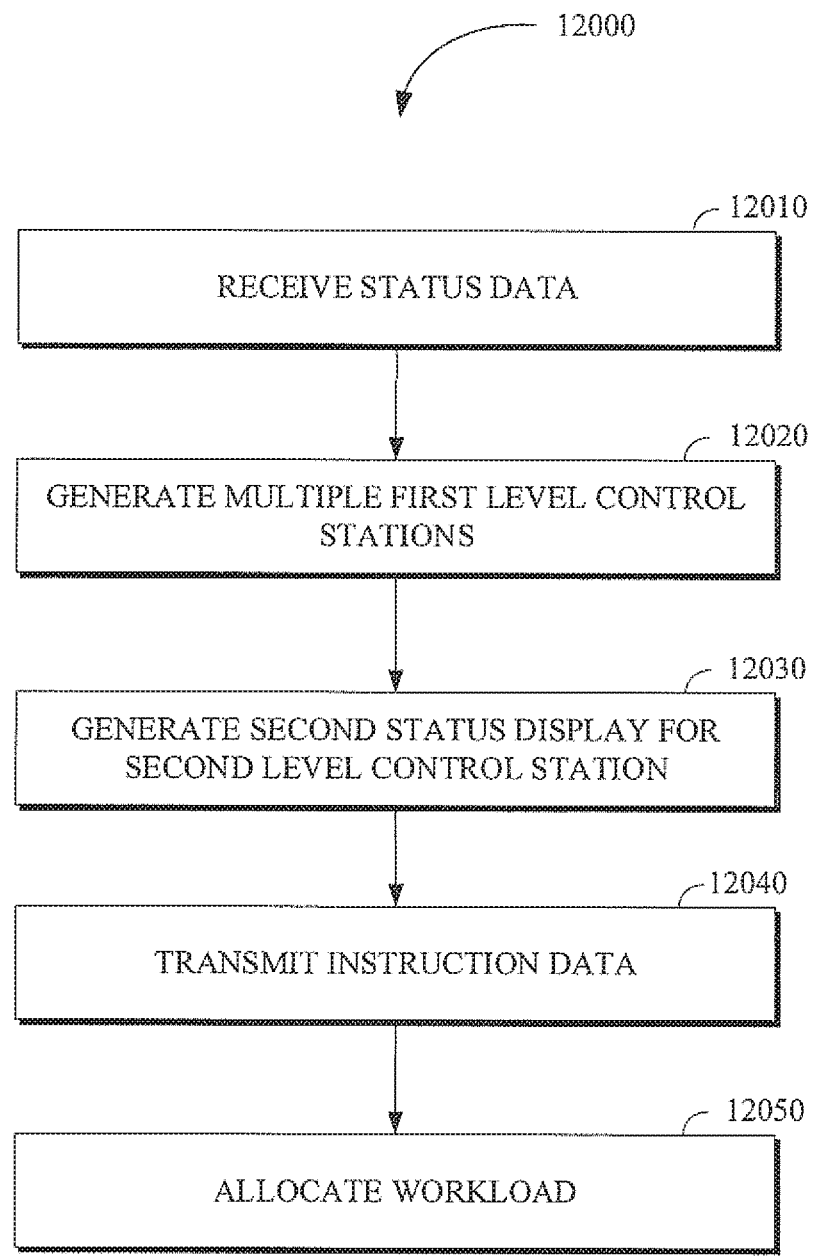
FIG. 12 is a flow chart of a technique for providing remote support of autonomous operation of vehicles in accordance with the present disclosure.
Figure 13:
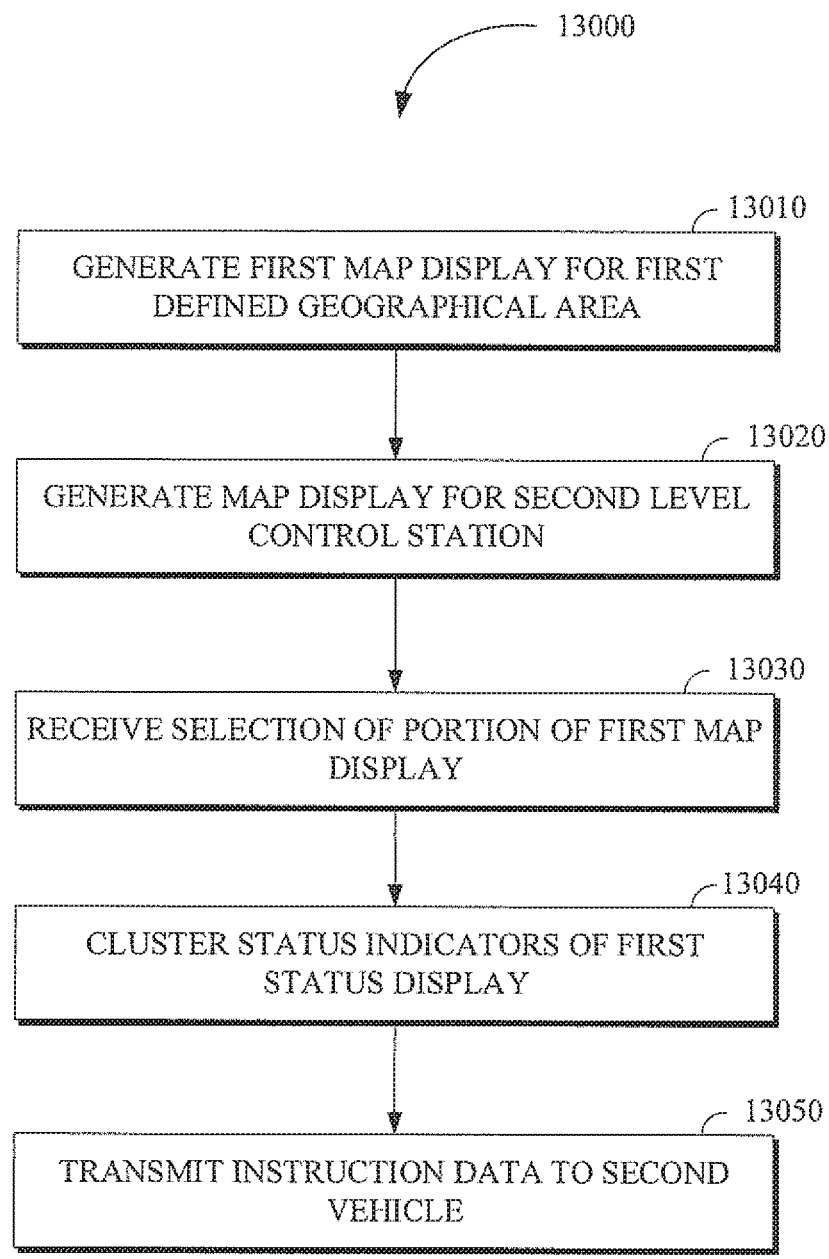
FIG. 13 is a flow chart of a technique for providing remote support of autonomous operation of vehicles in accordance with the present disclosure.

The steps, or operations, of any method, process, or algorithm described in connection with the implementations of the disclosed technology herein, may be implemented in hardware, firmware, software executed by hardware, circuitry, or any combination thereof. To facilitate explanation, the processes 11000-13000, shown in FIGS. 11-13, are depicted and described as a series of operations. However, the operations in accordance with this disclosure can occur in various orders or concurrently. Additionally, operations in accordance with this disclosure may occur with other operations not presented and described herein.

FIG. 11 is a flow chart of a technique 11000 for providing remote support of autonomous operation of vehicles in accordance with the present disclosure. In an implementation, the technique 11000 is utilized by a vehicle monitoring system or remote support system that includes any of a fleet manager, vehicle manager, and the aforementioned interfaces. Some or all aspects of the technique 11000 for vehicle processing may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 11000 for vehicle processing can be implemented in a system combining some or all of the features described in this disclosure.

At operation 11010, status or state data is received from one or more of the vehicles. In an implementation, the state data is received by a communication system or similar device of the vehicle monitoring system. The one or more vehicles can include a device or apparatus (e.g. a conveyance) that is used to transport objects including any of a passenger and cargo. The one or more vehicles can include an autonomous vehicle or a vehicle that is driven by a human driver or a semi-autonomous vehicle.

The state data includes but is not limited to data based on the state or condition of the vehicles, including any of kinetic data relating to any of the velocity and acceleration of a vehicle, location data, including the geographical location of a vehicle (e.g. the latitude and longitude of the vehicle) or the location of the vehicle with respect to another object, vehicle position, including the orientation and inclination (e.g. slope of the vehicle on an incline) of the vehicle, the operational state of the vehicle, including the electrical state or mechanical state of the vehicle (e.g. health of the electrical vehicle systems, mechanical vehicle systems, tire pressure, etc.), maintenance data related ongoing maintenance of the vehicle, energy source data including an amount of fuel remaining or an amount of battery charge remaining, sensor data based on outputs from sensors including, optical sensors, audio sensors, an motion sensors, internal state data, including a temperature and humidity inside the passenger cabin of the vehicle, and a current task (e.g., pick up a passenger) of the vehicle.

In an implementation, the state data can include a request for assistance from a vehicle, including a first vehicle. The first vehicle can include any of a vehicle that is selected from among the vehicles and a vehicle that is ranked or prioritized as first or high priority based on the state data associated with the vehicle. In an implementation, the sensor data can include image data received from a vehicle including the first vehicle. The image data can comprise a camera image including any of an image of an environment external to the first vehicle and an image of an occupant within or the interior of the first vehicle.

At operation 11020, a map is generated. In an implementation, a first map display of a defined geographical area is generated. The defined geographical area can be predetermined by an operator or automatically defined based on historical data or machine learning techniques. The first map display includes at least some or all of the vehicles within the defined geographical area. The vehicles in the defined geographical area can be represented as vehicle map indicators. In an implementation, in response to an input to a state indicator, an appearance of a vehicle map indicator representing a respective vehicle within the first map display is modified.

In an implementation, a second map display of another defined geographical area or the same defined geographical area that was utilized for the first map display is generated. The second map display includes the vehicles within the another defined geographical area and assigned to a first remote support queue as vehicle map indicators. The second map display can be displayed concurrently with another display, including any of the first state display and a second state display. In an implementation, the second map display can be generated as a semi-transparent overlay that is superimposed on top of another display including the first map display.

At operation 11030, a first status or state display is generated. The first state display includes state indicators corresponding to the state data of at least some of the vehicles that are associated with the first state display. The state indicators can include any of glyphs, images, text, shapes, pictograms, and any combination thereof. The first state display can be concurrently displayed with the first map display.

The state indicators can indicate any of an operating mode of the vehicle indicating whether the vehicle is receiving remote support or has requested remote support, an expected progress in completing the current task, an actual progress in completing the current task, a progress indicator indicating a deviation (if any) between the actual progress and the expected progress, the progress indicator indicating whether the vehicle is any of early, late, and on-time, and an issue related to operation of the vehicle. The state indicators indicate the aforementioned information using any of a color, a shape, and a size of at least a portion of a state indicator representing the vehicle in a state display including any of the first state display and the second state display, a timescale with a length based on an expected amount of time to complete the current task, the timescale including a line representing the actual progress and the progress indicator extending from the line, and along a length of the timescale indicating the deviation, a color of the progress indicator indicating whether the vehicle is any of early, late, and on time.

In an implementation, in response to an input to a vehicle map indicator, an appearance of the state indicator representing the respective vehicle is modified within the first state display. An input such as an input from an input device can cause a change in the state indicator including any of a change in color, size, shape, brightness, and text. For example, the text on the state indicator can be changed or updated from "pick up" to "drop off" when a passenger has been dropped off.

In an implementation, the vehicles are assigned to respective remote support queues, and the corresponding state indicators for the vehicles are generated for display in lanes corresponding to the respective remote support queues, for example, as shown in FIG. 5. For example, if there are ten vehicles being monitored overall, and there are five lanes corresponding to remote support queues that are each managed by a separate vehicle manager, an operator can assign two vehicles and their corresponding state indicators to each of the five lanes.

In an implementation, the state indicators can be moved between the remote support queues. For example, the state indicator for a vehicle can be moved by an operator (such as a fleet manager of the vehicle monitoring system) from a first lane associated with a first remote support queue to a second lane associated with a second remote support queue. By moving or reassigning the state indicators of the corresponding vehicles between remote support queues, the system can ensure that the vehicles are monitored and remotely supported properly. As another example, a fleet manager can assign a group of vehicles from a first vehicle manager to a second vehicle manager by changing the location of state indicators from a first remote support queue corresponding to the first vehicle manager to a second remote support queue corresponding to the second vehicle manager.

In an implementation, a second state display for a first remote support queue is generated. The second state display includes a representation of the state data of the vehicles assigned to the first remote support queue as respective state indicators arranged based on a level of urgency or priority associated with the vehicle represented by the state indicator. For example, a vehicle that is an ambulance on the way to drop off a passenger at a hospital could be associated with a high level of urgency. The level of urgency can be based on any of the state data associated with the vehicle, preferences, historical data, and real-time traffic data. Based on the level of urgency, the position or display of the state indicators can be modified. For example, a higher level of urgency (or higher urgency level) can correspond to a higher position (e.g., along a vertical axis) or can correspond to a larger state indicator in comparison to smaller state indicators that represent vehicles with lower levels of urgency.

In an implementation, the state indicators of the first state display comprise the state indicators of the second state display and elements of the state indicators of the first state display comprise a subset of elements of the state indicators of the second state display. For example, to facilitate grouping of large numbers of state indicators, the state indicators in the first state display can be simplified to show fewer details with respect to the state data of a vehicle. In another implementation, elements of the state indicators of the second state display comprise a subset of elements of the state indicators of the first state display.

At operation 11040, a remote support interface is generated. The remote support interface can be responsive to an input signal to any state indicators of the vehicles including but not limited to an input signal to a first state indicator of a first vehicle from the first state display. For example, an interaction with the first state indicator can generate a remote support interface with a task control, resolved control, reroute control, and call control, such as in the interface shown in FIG. 8. The remote support interface can be superimposed on the first state display and in an area surrounding the state indicator that has been interacted with using the input signal or the remote support interface can be a new display that is generated in response to the input signal.

In an implementation, a portion of the remote support interface is allocated to display any of an indication of sensor data including the camera image and an indication of map data representing the camera image in which the camera image comprises the image of the environment external of the first vehicle.

At operation 11050, instruction data is transmitted to any of the vehicles, such as a first vehicle. The instruction data includes instructions to the vehicle (e.g. the autonomous vehicle) for performance by the vehicle or by an occupant of the vehicle (e.g. a driver). By way of example, the instruction data includes but is not limited to any of controlling movement of a vehicle, including changing the acceleration, velocity, or direction (e.g. steering), of the vehicle, turning some or all parts of the vehicle on or off (e.g., turning on a light external to the vehicle), activating or deactivating a control system in the vehicle including mechanical control systems and electrical control systems, activating or deactivating sensors in the vehicle (e.g. activating a camera to view inside the vehicle or outside the vehicle), activating or deactivating a communication system that provides communications with the vehicle, occupants of the vehicle, and objects or individuals external to the vehicle.

In an implementation, transmitting the instruction data to the first vehicle can be initiated in response to any of receiving a signal to transmit the instruction data, including a command issued by a pre-programmed script, and using the remote support interface (e.g. a user interaction with the remote support interface). The instruction data can also be transmitted to a vehicle automatically in response to a detected state or situation based on the state data of the vehicle.

In an implementation, the instruction data includes a virtual lane within the map data to the first vehicle for the autonomous operation of the first vehicle to use for navigation of the first vehicle. For example, the instruction data can generate an image that can be included in a representation or model of an area within a predetermined distance of the vehicle, for example, the path indicator 10020 shown in FIG. 10. The virtual lane can help guide the autonomous vehicle around various obstructions or external objects that prompted the requirement of receiving the instruction data.

At operation, 11060, the vehicles are ranked according to a level of urgency for remote support. In an implementation, the vehicles in the first state display or the second state display or both are ranked according to the level of urgency. The level of urgency for the remote support can be determined based on the state data or user inputs or other types of aggregated data (e.g., time of day, typical urgency levels for similar vehicles garnered by analyzing historical data, etc.). For example, state data that indicates that a vehicle is thirty minutes behind schedule could have a greater level of urgency than a vehicle that is only twenty seconds behind schedule.

At operation 11070, the state indicators are arranged in the first state display based on the corresponding level of urgency. In an implementation, the arrangement can cluster similar urgency levels or list them from top to bottom in ascending or descending order. For example, the state indicators representing at least some of the vehicles can be moved from a lower portion of the first state display to an upper portion of the first state display in accordance with an increasing level of urgency. In another example, state indicators associated with lower levels of urgency can be displayed on the leftmost portion of a display with the state indicators being moved to the right as the level of urgency increases. In addition, state indicators that are below a certain urgency threshold level can be hidden from the display.

FIG. 12 is a flow chart of a technique 12000 for providing remote support of autonomous operation of vehicles in accordance with the present disclosure. Some or all of the technique 12000 for vehicle processing may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 12000 for vehicle processing can be implemented in a system combining some or all of the features described in this disclosure.

At operation 12010, status or state data is received from one or more of the vehicles. The state data includes an indication of the state or condition of the vehicles, such as, for example, the state data described in the process 11000.

At operation 12020, first level control stations are generated. The first level control stations can include instances that can receive inputs, process data including the state data, and produce an output including a display output. The first level control stations include respective first state displays that displays state indicators of the state data from a portion of the vehicles assigned to a respective one of the first level control stations. The first level control stations can comprise remote support queues and corresponding lanes and can be managed by an operator such as a vehicle manager.

At operation 12030, a second status or state display is generated for a second level control station. In an implementation, the second level control station is a fleet manager that manages the first level control stations and corresponding vehicle managers. In another implementation, multiple second state displays are generated for respective second level control stations. The second state display displays the state data of the vehicles and can either display similar or different state data that is displayed on the first state display. For example, the second level control station can correspond to a control station operated by a fleet manager and the first level control station can correspond to a control station operated by a vehicle manager under the authority of the fleet manager At operation 12040, in response to receiving an indication that a vehicle is requesting support, instruction data is transmitted to the vehicle. In an implementation, the instruction data is transmitted without receiving the indication (e.g., a request for support). The instruction data can be transmitted to a first vehicle displayed in one of the first state displays of the first level control stations. The instruction data can include instructions for remote operation of the vehicle, including the instruction data described in the technique 11000 in FIG. 11.

At operation 12050, a workload is allocated or balanced or optimized between the first level control stations by an operator (such as a fleet manager) that assigns the vehicles using the state indicators of the second state display. In an implementation, the assignment is automated based upon a detection by the system that there is an imbalance between the workload or one of the vehicle managers is in urgent need of help (e.g., the vehicle manager is monitoring too many vehicles or one of the vehicles requires time-consuming support and thus the other vehicles should be reassigned for a predetermined time period). The workload can be based on any of the state data, external data, historical data, and the distribution of the vehicles to the first level control stations.

FIG. 13 is a flow chart of a technique 13000 for providing remote support of autonomous operation of vehicles in accordance with the present disclosure. Some or all aspects of the technique 13000 for vehicle processing may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 13000 for vehicle processing can be implemented in a system combining some or all of the features described in this disclosure.

At operation 13010, a map display of a defined geographical area is generated. In an implementation, the map display can include a first map display of a first defined geographical area that is generated for respective first level control stations. The first map display includes vehicle map indicators to indicate the vehicles within the defined geographical area and assigned to the respective one of the first level control stations as vehicle map indicators. The first map display can be concurrently displayed with the respective first state display.

At operation 13020, another map display of a defined geographical area is generated. In an implementation, the another map display is a second map display of the first defined geographical area (or another defined geographical area) that is generated for a second control station. The second map display includes vehicle map indicators to indicate the vehicles within the first defined geographical area and assigned to the second control station as the vehicle map indicators. The second map display can be concurrently displayed with the respective second state display. At operation 13030, an input selecting a portion of a first map display of a respective first level control station is received. For example, the input can include a selection signal from an input device.

At operation 13040, the state indicators of the first state display are clustered corresponding to the selection of operation 13030. In an implementation, the state indicators of the first state display of the respective first level control station are clustered based on respective locations of those of the vehicles assigned to the first level control station relative to a location of the selected portion of the first map display. For example, the vehicles that are within a predetermined distance of each other can be clustered together by selecting a portion of the first map display that encompasses or surrounds the vehicles that are within a predetermined distance of each other. In an implementation, the clustering of the state indicators can be based on the state data or observed data or preferences.

At operation 13050, instruction data is transmitted to all or a portion of the vehicles within a cluster. In an implementation, the instruction data is transmitted to the second vehicle based on the instruction data that has been sent or transmitted to the first vehicle. The instruction data can include instructions to control or communicate with the vehicle and can include the instruction data described in the technique 11000 of FIG. 11. In an implementation, the transmission of the instruction data can be initiated based on an input to a second state indicator representing a second vehicle in a cluster in common with the first state indicator representing the first vehicle.

Figure 14:
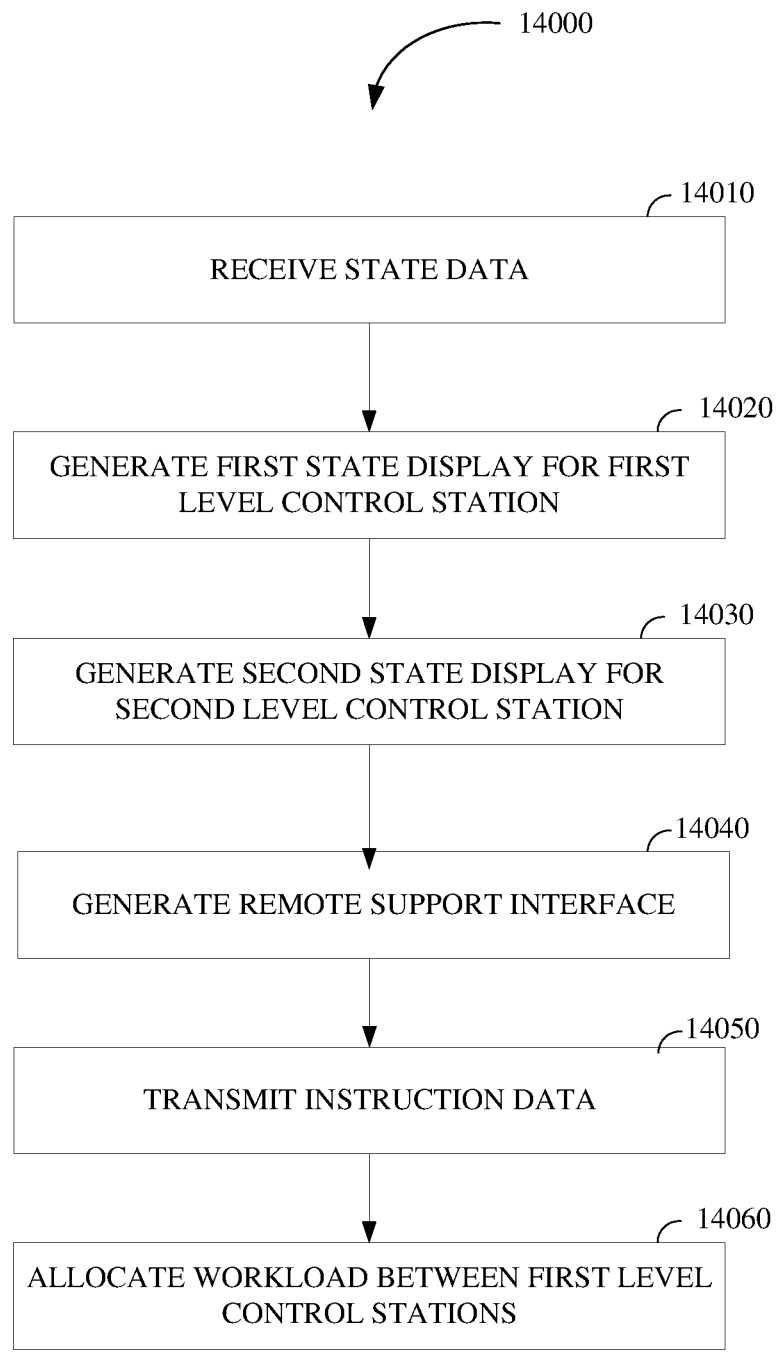
FIG. 14 illustrates a method for remote support in accordance with the present disclosure.

FIG. 14 illustrates a method 14000 for remote support in accordance with the present disclosure. The method 14000 includes receiving state data from the vehicles, via 14010, generating, for first level control stations, a respective first state display that displays the state data from a portion of the vehicles assigned to a respective one of the first level control stations as respective state indicators, via 14020, generating, for a second level control station, a second state display that displays the state data of the vehicles, via 14030, generating a remote support interface including the first state display and image data received from a first vehicle of the vehicles, via 14040, transmitting, using a state indicator representing a first vehicle in one of the first state displays, instruction data to the first vehicle based on an indication that the first vehicle needs remote support, the instruction data, once received by the first vehicle, modifying autonomous operation of the first vehicle, via 14050, and allocating a workload between the first level control stations by assigning the vehicles using the state indicators of the second state display, via 14060.

The disclosed technology offers the benefits of a way to more effectively organize data relating to the operation of autonomous vehicles in a transportation network. The disclosed technology can receive state data indicative of the state of an autonomous vehicle, which can be used to prioritize the vehicles in order to more efficiently route vehicles that are in transit and assist vehicles are malfunctioning or adversely affected by an external factor. Further, the disclosed technology provides an improved way for human operators to remotely control autonomous vehicles, thereby reducing disruptions in the transportation network.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A remote support apparatus comprising:
a memory; and
a processor configured to execute instructions stored in the memory to:
receive state data from vehicles;
generate a first map display including a representation of a geographical area and vehicle map indicators representing a portion of the vehicles within the geographical area;
generate a first state display including a representation of the portion of the vehicles as state indicators;
generate a remote support interface including the first state display and image data received from a first vehicle of the portion of the vehicles, wherein the remote support interface is responsive to an input signal to a first state indicator of the first vehicle from the first state display;
transmit instruction data to the first vehicle to modify an autonomous operation of the first vehicle based on the input signal to the remote support interface;
rank the vehicles according to a level of urgency based on the state data;
position the state indicators in the first state display based on the level of urgency corresponding to the state indicators;
assign the vehicles to respective remote support queues;
generate the first state display by displaying lanes, each lane corresponding to a respective remote support queue, the state indicators arranged in the lanes based on an assignment of at least one vehicle corresponding to the respective remote support queue; and assign a vehicle from a first one of the remote support queues to a second one of the remote support queues by moving a respective state indicator from a first lane representing the first one of the remote support queues to a second lane representing the second one of the remote support queues.

2. The apparatus of claim 1, wherein the first state display is displayed concurrently with the first map display.

3. The apparatus of claim 1, wherein the processor is further configured to execute instructions stored in the memory to:

receive a request for assistance from the first vehicle; and
responsive to the request for assistance, change an appearance of the first state indicator in the first state display.

4. The apparatus of claim 1, wherein the image data comprises a camera image including any of an image of an environment external to the first vehicle and an image of an occupant within the first vehicle, wherein the remote support interface displays the camera image.

5. The apparatus of claim 4, wherein the processor is further configured to execute instructions stored in the memory to:

generate the remote support interface by including map data representing the image of the environment external to the first vehicle; and
transmit the instruction data to the first vehicle to modify the autonomous operation of the first vehicle by transmitting a virtual lane within the map data to the first vehicle for use in navigation of the first vehicle.

6. The apparatus of claim 1, wherein the processor is further configured to execute instructions stored in the memory to:

display the state data of a vehicle by displaying any of a current task of the vehicle, an operating mode of the vehicle that indicates whether the vehicle is receiving remote support, a deviation of the vehicle from an expected progress of the current task, whether the deviation is ahead of or behind the expected progress, and an issue related to operation of the vehicle, wherein the display utilizes at least one of a color, a shape, and a size of at least a portion of a state indicator representing the vehicle in the first state display.

7. The apparatus of claim 6, wherein the processor is further configured to execute instructions stored in the memory to:

generate a first map display of a defined geographical area that displays those of the vehicles within the defined geographical area as vehicle map indicators, the first map display displayed concurrently with the first state display.

8. The apparatus of claim 7, wherein the processor is further configured to execute instructions stored in the memory to:

in response to an input to a state indicator associated with a respective vehicle, modify an appearance of a vehicle map indicator representing the respective vehicle within the first map display; and
in response to an input to the vehicle map indicator, modify an appearance of the state indicator representing the respective vehicle within the first state display.

9. The apparatus of claim 7, wherein the vehicles are assigned to respective remote support queues, and the instructions include instructions to:

generate a second state display for a remote support queue that displays the state data of those of the vehicles assigned to the remote support queue as respective state indicators arranged based on the level of urgency; and
generate a second map display of a second defined geographical area that displays those of the vehicles within the second defined geographical area and assigned to the remote support queue as vehicle map indicators, the second map display displayed concurrently with the second state display.

10. The apparatus of claim 9, wherein the state indicators of the first state display comprise the state indicators of the second state display and elements of the state indicators of the first state display comprise a subset of elements of the state indicators of the second state display.

11. The apparatus of claim 10, wherein the state data comprises any of a current task of the vehicle, an operating mode of the vehicle indicating whether the vehicle is receiving remote support, an expected progress in completing the current task, an actual progress in completing the current task, a progress indicator indicating a deviation between the actual progress and the expected progress, a progress indicator indicating whether the vehicle is early, late, or on time, and an issue related to operation of the vehicle.

12. The apparatus of claim 11, wherein the state indicator representing the vehicle in the second state display includes a timescale with a length based on an expected amount of time to complete the current task, the timescale including a line representing actual progress and a progress indicator extending from the line and along a length of the timescale indicating a deviation, a color of the progress indicator indicating whether the vehicle is any of early, late, and on-time.

13. A method for remote support of autonomous operation of vehicles, the method comprising:

receiving state data from the vehicles;
generating a first map display of a first defined geographical area that displays those of the vehicles within the first defined geographical area as vehicle map indicators;
generating a first state display that displays the state data from a portion of the vehicles as state indicators;
generating a remote support interface including the first state display and image data received from a first vehicle of the vehicles, wherein the remote support interface is responsive to an input signal to a first state indicator of the first vehicle from the first state display;
transmitting, using the remote support interface, instruction data to the first vehicle based on an indication that the first vehicle needs remote support, the instruction data, once received by the first vehicle, modifying autonomous operation of the first vehicle
ranking the vehicles according to a level of urgency based on the state data;
positioning the state indicators in the first state display based on the level of urgency corresponding to the state indicators;
assigning the vehicles to respective remote support queues;
generating the first state display by displaying lanes, each lane corresponding to a respective remote support queue, the state indicators arranged in the lanes based on an assignment of at least one vehicle corresponding to the respective remote support queue; and
assigning a vehicle from a first one of the remote support queues to a second one of the remote support queues by moving a respective state indicator from a first lane representing the first one of the remote support queues to a second lane representing the second one of the remote support queues.

14. The method of claim 13, further comprising:

receiving a selection of a portion of a first map display of a first level control station;

clustering the state indicators of the first state display of the first level control station based on respective locations of those of the vehicles assigned to the first level control station relative to a location of the portion of the first map display; and transmitting, using a second state indicator representing a second vehicle in a cluster in common with the state indicator representing the first vehicle, instruction data to the second vehicle based on the instruction data transmitted to the first vehicle.

\* \* \* \* \*